(12) United States Patent
Ito et al.

(10) Patent No.: US 6,222,587 B1
(45) Date of Patent: Apr. 24, 2001

(54) FOCUS CONTROL METHOD AND VIDEO CAMERA

(75) Inventors: Yujiro Ito; Naoki Inomata; Chiaki Ikeyama; Susumu Kurita, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/776,896

(22) PCT Filed: Jun. 5, 1996

(86) PCT No.: PCT/JP96/01525

§ 371 Date: Mar. 21, 1997

§ 102(e) Date: Mar. 21, 1997

(87) PCT Pub. No.: WO97/00574

PCT Pub. Date: Jan. 3, 1997

(30) Foreign Application Priority Data

Jun. 14, 1995 (JP) .................................................. 7-147284

(51) Int. Cl.⁷ ............................ H04N 5/232; G03B 13/00
(52) U.S. Cl. ............................ 348/345; 348/349; 348/354
(58) Field of Search .................................. 348/345, 349, 348/353, 354, 355, 356, 357; 396/82, 90, 93, 121, 123, 102; H04N 5/232; G03B 13/00

(56) References Cited

U.S. PATENT DOCUMENTS

| | | | |
|---|---|---|---|
| 5,003,339 | * 3/1991 | Kikuchi et al. | 348/347 |
| 5,055,665 | * 10/1991 | Baba et al. | 396/102 |
| 5,093,716 | * 3/1992 | Kondo et al. | 348/224 |
| 5,128,768 | * 7/1992 | Suda et al. | 348/352 |
| 5,200,828 | * 4/1993 | Jang et al. | 348/345 |
| 5,361,095 | * 11/1994 | Toshinobu et al. | 348/354 |
| 5,396,336 | * 3/1995 | Yoshii et al. | 348/345 |
| 5,534,923 | * 7/1996 | Suda | 348/354 |
| 5,629,735 | * 5/1997 | Kaneda et al. | 348/350 |
| 6,034,727 | * 3/2000 | Ito et la. | 348/354 |

FOREIGN PATENT DOCUMENTS

| | | |
|---|---|---|
| 62-148912 | 7/1987 | (JP) . |
| 6-141223 | 5/1994 | (JP) . |
| 6-153054 | 5/1994 | (JP) . |

* cited by examiner

Primary Examiner—Wendy Garber
Assistant Examiner—Aung S. Moe
(74) Attorney, Agent, or Firm—Frommer Lawrence & Haug, LLP; William S. Frommer; Bruno Polito

(57) ABSTRACT

An autofocus apparatus of an imaging apparatus is one having an estimation-value calculating unit for obtaining a plurality of estimation values by using a plurality of areas and a plurality of filters for extracting a horizontal-direction frequency component in a specific image area of a video signal corresponding to a specific image area and supplied from an imaging apparatus for effectively carrying out an autofocus operation of a television camera, a signal processing unit for calculating a control value used for controlling an image pickup lens drive unit of the imaging apparatus in response to an estimation value calculated by the above estimation-value calculating unit, and an output unit for supplying the above control value to the above image pickup lens drive unit. The autofocus apparatus includes a control program for determining a focus detection direction by decision by majority of a plurality of weighted estimation values obtained by combination of the above plurality of areas and the above plurality of filters.

15 Claims, 21 Drawing Sheets

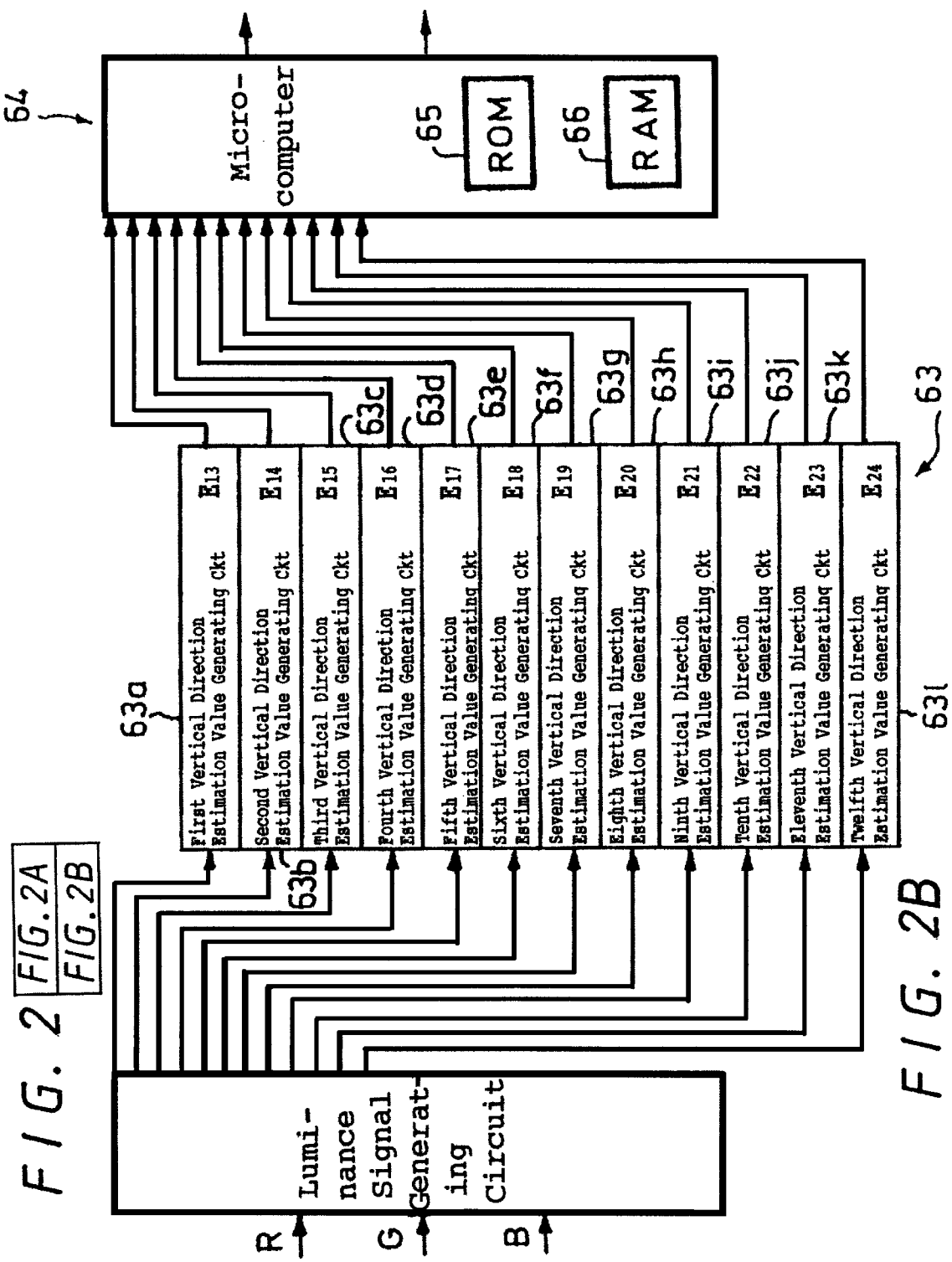

FIG. 5A

| | α | H × V |
|---|---|---|
| First Horizontal Direction Estimation Value Generating Ckt | 0.5 | 192 × 60 |
| Second Horizontal Direction Estimation Value Generating Ckt | 0.5 | 132 × 60 |
| Third Horizontal Direction Estimation Value Generating Ckt | 0.5 | 384 × 120 |
| Fourth Horizontal Direction Estimation Value Generating Ckt | 0.5 | 264 × 120 |
| Fifth Horizontal Direction Estimation Value Generating Ckt | 0.5 | 768 × 240 |
| Sixth Horizontal Direction Estimation Value Generating Ckt | 0.5 | 548 × 240 |
| Seventh Horizontal Direction Estimation Value Generating Ckt | 0.92 | 192 × 60 |
| Eighth Horizontal Direction Estimation Value Generating Ckt | 0.92 | 132 × 60 |
| Ninth Horizontal Direction Estimation Value Generating Ckt | 0.92 | 384 × 120 |
| Tenth Horizontal Direction Estimation Value Generating Ckt | 0.92 | 264 × 120 |
| Eleventh Horizontal Direction Estimation Value Generating Ckt | 0.92 | 768 × 240 |
| Twelfth Horizontal Direction Estimation Value Generating Ckt | 0.92 | 548 × 240 |

FIG. 5B

| | α | H × V |
|---|---|---|
| First Vertical Direction Estimation Value Generating Ckt | 0.5 | 120 × 80 |
| Second Vertical Direction Estimation Value Generating Ckt | 0.5 | 120 × 60 |
| Third Vertical Direction Estimation Value Generating Ckt | 0.5 | 240 × 160 |
| Fourth Vertical Direction Estimation Value Generating Ckt | 0.5 | 240 × 120 |
| Fifth Vertical Direction Estimation Value Generating Ckt | 0.5 | 480 × 320 |
| Sixth Vertical Direction Estimation Value Generating Ckt | 0.5 | 480 × 240 |
| Seventh Vertical Direction Estimation Value Generating Ckt | 0.92 | 120 × 80 |
| Eighth Vertical Direction Estimation Value Generating Ckt | 0.92 | 120 × 60 |
| Ninth Vertical Direction Estimation Value Generating Ckt | 0.92 | 240 × 160 |
| Tenth Vertical Direction Estimation Value Generating Ckt | 0.92 | 240 × 120 |
| Eleventh Vertical Direction Estimation Value Generating Ckt | 0.92 | 480 × 320 |
| Twelfth Vertical Direction Estimation Value Generating Ckt | 0.92 | 480 × 240 |

FIG. 7

| Estimation Value $E_i$ | Weight Data $W_i$ |
|---|---|
| $E_1$ | 20 |
| $E_2$ | 15 |
| $E_3$ | 10 |
| $E_4$ | 10 |
| $E_5$ | 8 |
| $E_6$ | 8 |
| $E_7$ | 15 |
| $E_8$ | 12 |
| $E_9$ | 8 |
| $E_{10}$ | 8 |
| $E_{11}$ | 6 |
| $E_{12}$ | 6 |
| $E_{13}$ | 5 |
| $E_{14}$ | 5 |
| $E_{15}$ | 3 |
| $E_{16}$ | 3 |
| $E_{17}$ | 2 |
| $E_{18}$ | 2 |
| $E_{19}$ | 4 |
| $E_{20}$ | 4 |
| $E_{21}$ | 2 |
| $E_{22}$ | 2 |
| $E_{23}$ | 1 |
| $E_{24}$ | 1 |

B   A   W2  W1

B   A   W2  W1

FOCUS CONTROL METHOD AND VIDEO CAMERA

TECHNICAL FIELD

The present invention relates to a focus control method of focusing a lens on an object upon an image pickup thereof and a video camera apparatus for focusing its lens on the object by using the focus control method.

BACKGROUND ART

A consumer video camera has employed an autofocus method of automatically focusing a lens on an object.

It is well known that, in order to discriminate whether or not a lens is in focus or out of focus, it is sufficient to discriminate whether contrast of a video signal obtained by an image pickup is high or low. In other words, if the contrast is high, then the lens is in focus. If on the other hand the contrast is low, then the lens is out of focus. A high-frequency component is extracted from the video signal obtained by an image pickup, and a data obtained by integrating the high-frequency component in a predetermined set area is generated. It is possible to discriminate whether the contrast is high or low, by using the integrated data. The integrated data is indicative of how much there is the high-frequency component in the predetermined area. In general, this data is called an estimation value. Accordingly, it is possible to realize the autofocus method by driving a focus lens so that the estimation value should be maximum (i.e., the contrast should be. maximum).

The estimation value extracted by the above method inevitably includes a plurality of factors in response to a state of an object upon the image pickup thereof. Hence, it is impossible to precisely determine a focus deviation amount based on the estimation value. Such estimation value inevitably includes a noise corresponding to an image pickup condition as an element thereof, and hence it is difficult to precisely extract a focus deviation, which is fundamentally necessary, amount from such estimation value. Therefore, since it is impossible for a conventional focus controlling apparatus and a conventional video camera to obtain a precise estimation value, it takes a considerable time for the conventional focus controlling apparatus and the conventional video camera to search for a maximum point of an estimation value. As a result, a camera man must continue taking a blurred picture while the above conventional focus controlling apparatus or the above conventional video camera is carrying out a focusing operation.

For example, it is sometimes observed that an image picked up by a video camera apparatus for use in a broadcasting station or for professional use is transmitted on the air as a live relay broadcast. If it is sometimes observed that in such live relay broadcast the satisfactory accuracy of the estimation value is not achieved and hence it takes a considerable time to carry out the autofocus operation, a video signal indicative of a blurred picture is transmitted on air. Therefore, a simplified, inexpensive and small autofocus apparatus such as that used in a consumer video camera is not necessary for the video camera for use in the broadcasting station or for professional use, but a high-accuracy focus control and a high-speed focus control are required therefor.

It is an object of the present invention to make it possible to generate an estimation value corresponding to an image pickup condition and to detect a focus position at high speed.

DISCLOSURE OF THE INVENTION

According to a gist of the present invention, a focus control apparatus includes estimation-value generating means for generating plural kinds of estimation values corresponding to combination of plural kinds of filter means and plural kinds of detection windows from a high-frequency component of a video signal output from an imaging means, an arithmetic means for calculating weight data set so as to correspond to the estimation values based on a plurality of estimation values generated by the above estimation-value generating means, and a control means for determining a focus detection direction based on the weight data calculated by the arithmetic means.

Moreover, according to a gist of the present invention, a video camera apparatus includes estimation-value generating means for generating plural kinds of estimation values corresponding to combination of plural kinds of filter means and plural kinds of detection windows, from a high-frequency component of a video signal output from an imaging means, an arithmetic means for calculating weight data set so as to correspond to the estimation values based on a plurality of estimation values generated by the above estimation-value generating means, and a control means for determining a focus detection direction based on the weight data calculated by the arithmetic means.

According to the present invention, it is possible to obtain a precise estimation value used for bringing an object into focus.

BRIEF DESCRIPTION OF DRAWINGS

FIG. 5 is a table showing a filter coefficient $\alpha$ and a window size set for respective circuits of the horizontal-direction estimation value generating circuit 62 and the vertical-direction estimation value generating 63;

FIG. 7 is a table showing weight data W set for respective estimation values E;

BEST MODE CARRYING OUT THE INVENTION

Initially, a focus control method and a video camera employing the above focus control method according to an embodiment of the present invention will hereinafter be described with reference to FIGS. 1 to 18.

Figures 1, 1A:
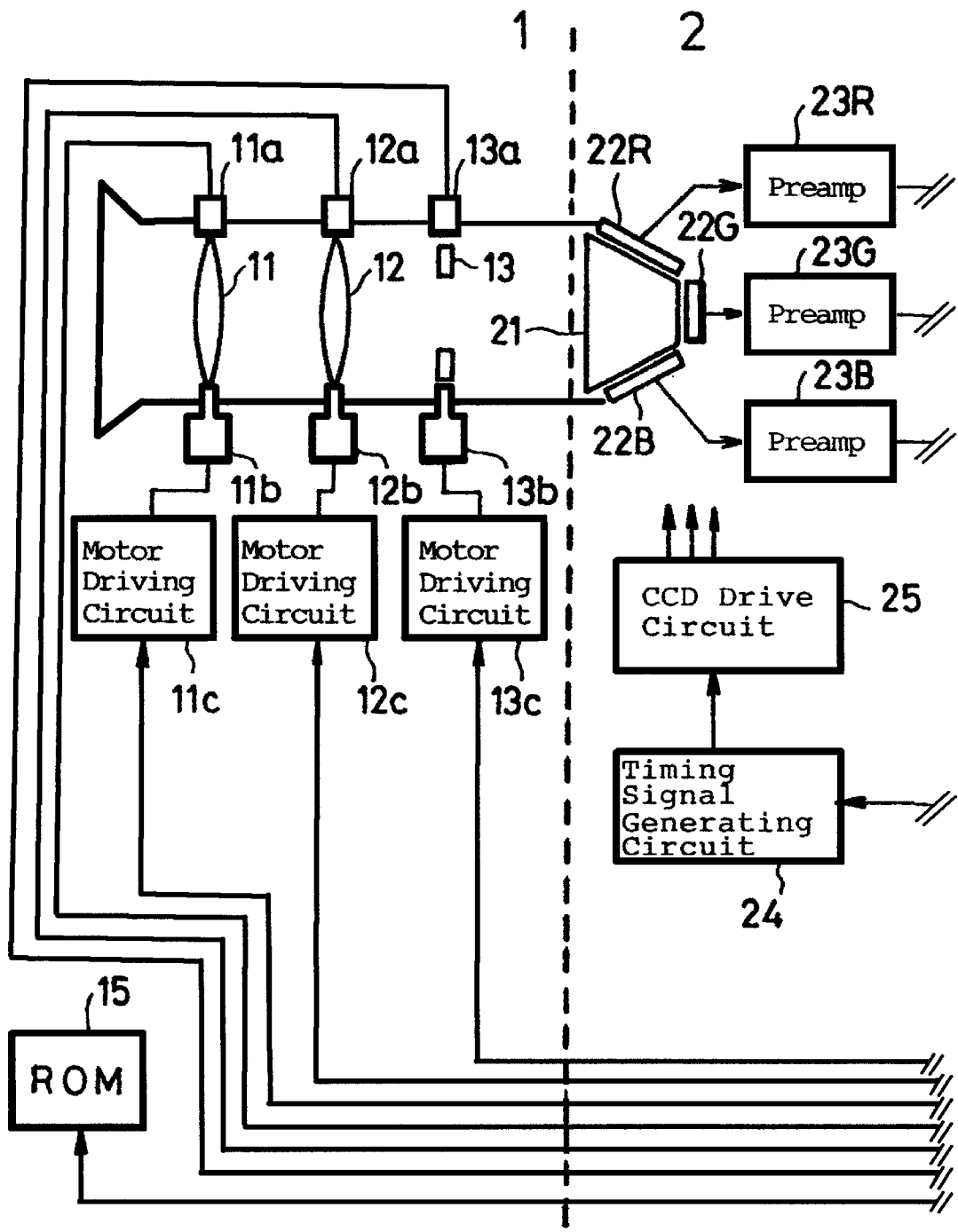
FIG. 1 is a diagram showing an entire arrangement of a video camera to which an autofocus apparatus is applied.
Figure 1:
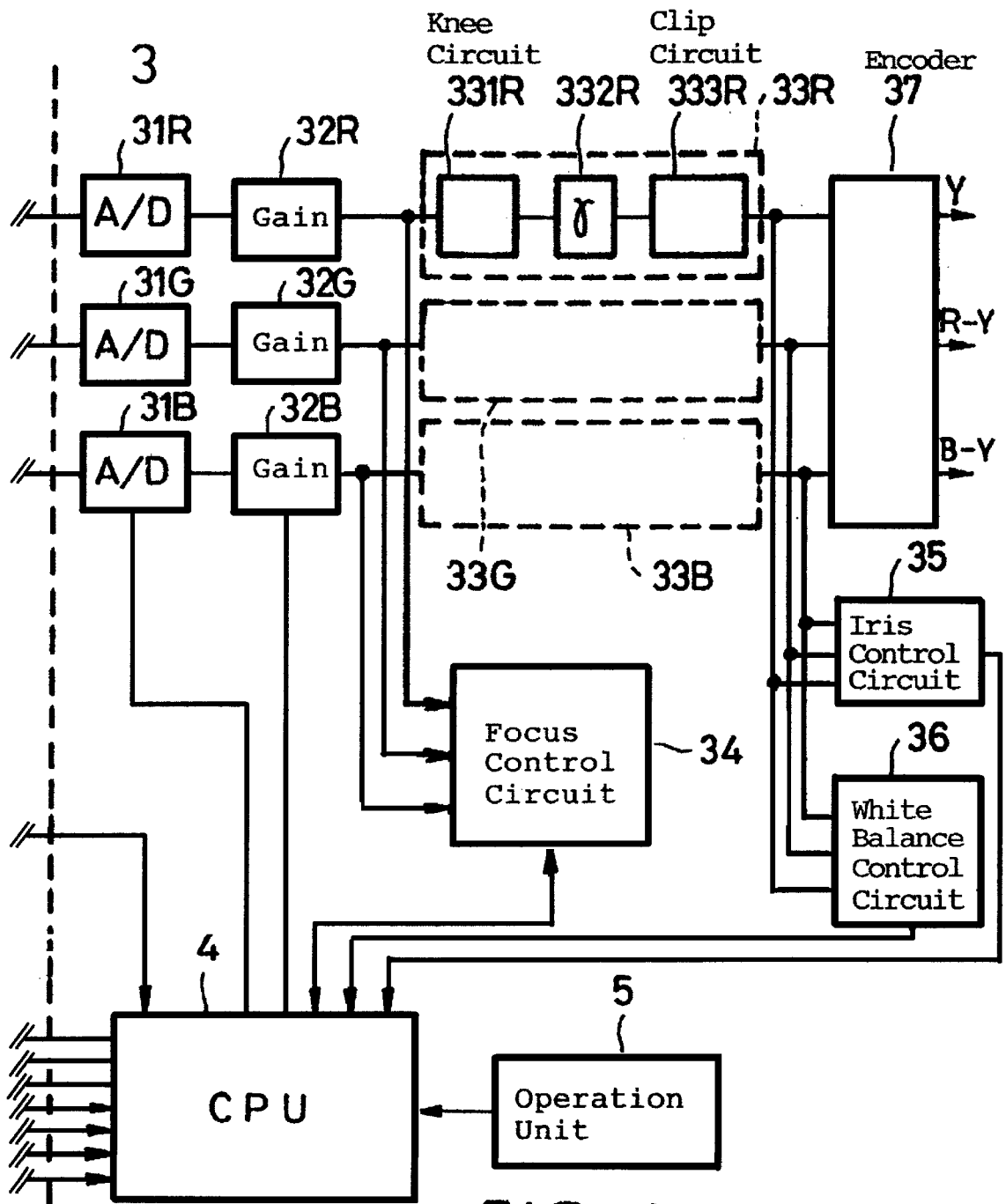

A total arrangement of the video camera apparatus according to the present invention will be described with reference to FIG. 1. The video camera apparatus includes a lens block 1 for optically condensing incident light to the front of an imaging device, an imaging block 2 for converting light incident from the lens block into RGB electric video signals obtained by an image pickup, a signal processing block 3 for subjecting the video signals to a predetermined signal processing, and a CPU 4 for controlling the lens block 1, the imaging block 2, and the signal processing block.

The lens block 1 is detachably provided in a video camera apparatus body. This lens block 1 includes, as optical elements, a zoom lens 11 for, by moving along an optical axis, continuously change a focal length without changing a position of an image point to thereby zoom an image of an object, a focus lens 12 for bringing the object into focus, and an iris mechanism 13 for adjusting an amount of light incident on the front of the imaging device by changing its aperture area.

The lens block 1 further includes a position detecting sensor 11a for detecting an optical-axis direction position of the zooming lens 11, a drive motor 11b for moving the zooming lens 11 in the optical-axis direction, a zoom-lens drive circuit 11c for supplying a drive control signal to the drive motor 11b, a position detecting sensor 12a for detecting an optical-axis direction position of the focus lens 12, a drive motor 12b for moving the focus lens 12 in the optical-axis direction, a focus-lens drive circuit 12c for supplying a drive control signal to the drive motor 12b, a position detecting sensor 13a for detecting an aperture position of the iris mechanism 13, a drive motor 13b for opening and closing the iris mechanism 13, and an iris mechanism drive circuit 13c for supplying a drive control signal to the drive motor 13b.

Detection signals from the position detecting sensors 11a, 12a, 13a are always supplied to the CPU 4. The zooming lens drive circuit 11c, the focus lens drive circuit 12c, and the iris mechanism drive circuit 13c are electrically connected to the CPU 4 so as to be supplied with control signals from the latter.

The lens block 1 has an EEROM 15 for storing a focal length data of the zoom lens 11 and an aperture ratio data there of, a focal length data of the focus lens 12 and an aperture ratio thereof, and a manufacturer name of the lens block 1 and a serial number thereof. The EEPROM 15 is connected to the CPU 4 so that the respective data stored therein are read out therefrom based on a read comma nd from the CPU 4.

The imaging block 2 has a color separation prism 21 for color-separating incident light from the lens block 1 into three primary-color lights of red (R), green (G) and blue (B) and imaging devices 22R, 22G and 22B for converting lights of R component, G component and B component, which are obtained by separating light at the color separation prism 21 and are focused on image surfaces thereof, into electric video signals (R), (G), (B) to output the signals. Each of these imaging devices 22R, 22G and 22B is formed of a CCD (Charge Cupled Device), for example.

The imaging block 21 has preamplifiers 23R, 23G, 23B for respectively amplifying levels of the video signals (R), (G), (B) output from the imaging devices 22R, 22G, 22B and for carrying out correlated double sampling for removing a reset noise.

The imaging block 2 further has a timing signal generating circuit 24 for generating a VD signal, an HD signal and a CLK signal each serving as a basic clock used for operation of each of circuits in the video camera apparatus based on a reference clock from a reference clock circuit provided therein, and a CCD drive circuit 25 for supplying a drive clock to the imaging device 22R, the imaging device 22G and the imaging device 22B based on the VD signal, the HD signal and the CLK signal supplied from the timing signal generating circuit. The VD signal is a clock signal representing one vertical period. The HD signal is a clock signal representing one horizontal period. The CLK signal is a clock signal representing one pixel clock. The timing clock formed of these VD, HD and CLK signals is supplied to each of the circuits in the video camera apparatus through the CPU 4, though not shown.

The signal processing block 3 i s a block provided in the video camera apparatus for subjecting the video signals (R), (G), (B) supplied from the imaging block 2 to a predetermined signal processing. The signal processing block 3 has A/D converter circuits 31R, 31G, 31B for respectively converting the analog video signals (R), (G), (B) into digital video signals (R), (G), (B), gain control circuits 32R, 32G, 32B for respectively controlling gains of the digital video signals (R), (G), (B) based on a gain control signal from the CPU 4, and signal processing circuits 33R, 33G, 33B for respectively subjecting the digital video signals (R), (G), (B) to a predetermined signal processing. The signal processing circuits 33R, 33G, 33B have knee circuits 331R, 331G, 331B for compressing the video signals to a certain degree or more, γ correction circuits 332R, 332G, 332B for correcting the levels of the video signals in accordance with a preset γ curve, and B/W clip circuits 333R, 333G, 333B for clipping a black level smaller than a predetermined level and a white level larger than a predetermined level. Each of the signal processing circuits 33R, 33G, 33B may have a known black 7 correction circuit, a known contour emphasizing circuit, a known linear matrix circuit and so on other than the knee circuit, the γ correction circuit, and the B/W clip circuit.

The signal processing block 3 has an encoder 37 for receiving the video signals (R), (G), (B) output from the signal processing circuits 33R, 33G, 33B and for generating a luminance signal (Y) and color-difference signals (R-Y), (B-Y) from the video signals (R), (G), (B).

The signal processing block 3 further has a focus control circuit 34 for receiving the video signals (R), (G), (B) respectively output from the gain control circuit 32R, 32G, 32B and for generating an estimation data E and a direction data Dr both used for controlling the focus based on the video signals (R), (G), (B), an iris control circuit 35 for receiving the video signals (R), (G), (B) respectively output from the signal processing circuits 33R, 33G, 33B and for controlling the iris based on the levels of the received signals so that an amount of light incident on each of the imaging devices 22R, 22G, 22B should be a proper amount of light, and a white balance controlling circuit 36 for receiving the video signals (R), (G), (B) respectively output from the signal processing circuits 33R, 33G, 33B and for carrying out white balance control based on the levels of the received signals.

The iris control circuit 35 has an NAM circuit for selecting a signal having a maximum level from the supplied video signals (R), (G), (B), and divides the selected signal with respect to areas of a picture corresponding thereto to totally integrate each of the video signals corresponding to the areas of the picture. The iris control circuit 35 considers every illumination condition of an object such as back lighting, front lighting, flat lighting, spot lighting or the like to generate an iris control signal used for controlling the iris, and supplies this iris control signal to the CPU 4. The CPU 4 supplies a control signal to the iris drive circuit 13c based on the iris control signal.

The white balance controlling circuit 36 generates a white balance control signal from the supplied video signals (R), (G), (B) so that the generated signal should satisfy (R-Y)=0 and (B-Y)=0, and supplies this white balance control signal to the CPU 4. The CPU 4 supplies a gain control signal to the gain controlling circuits 32R, 32G, 32B based on the white balance control signal.

Figure 2A:
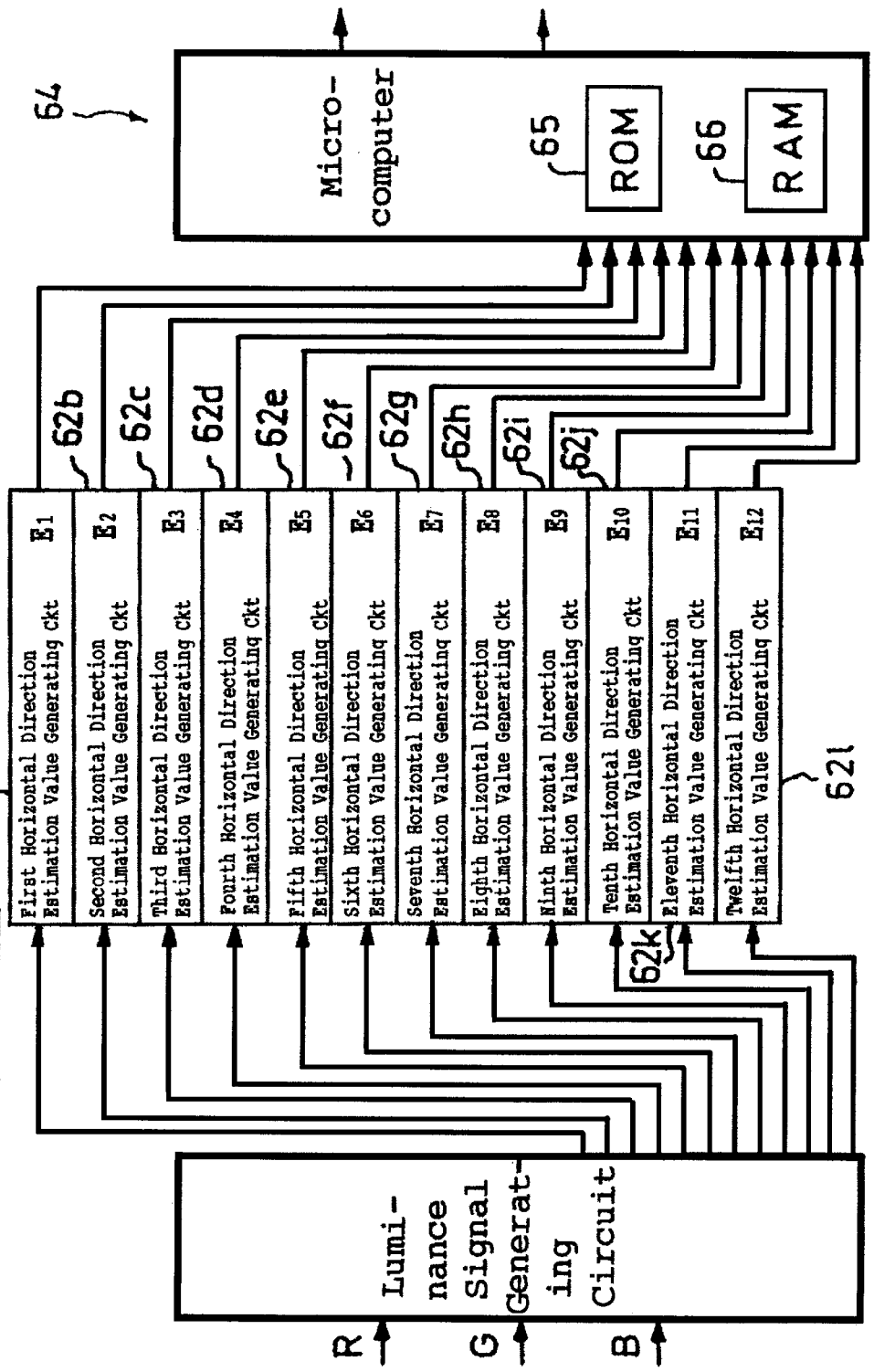
FIG. 2 is a diagram showing a specific arrangement of an autofocus controlling circuit 34.

The focus control circuit 34 will hereinafter be described in detail with reference to FIG. 2.

The focus control circuit 34 has a luminance signal generating circuit 61, a horizontal-direction estimation value generating circuit 62, a vertical-direction estimation value generating circuit 63, and a microcomputer 64.

The luminance-signal generating circuit 61 is a circuit for generating a luminance signal from the supplied video signals R, G, B. In order to determine whether the lens is in focus or out of focus, it is sufficient to determine whether the contrast is high or low. Therefore, since change of the contrast has no relation with change of a level of a chrominance signal, it is possible to determine whether the contrast is high or low, by detecting only the change of a level of the luminance signal.

The luminance-signal generating circuit 61 can generate the luminance signal Y by subjecting the supplied video signals R, G, B to a known calculation based on $$Y = 0.3\,R + 0.59\,G + 0.11\,B \tag{1}$$

The horizontal-direction estimation value generating circuit 62 is a circuit for generating a horizontal-direction estimation value. The horizontal-direction estimation value is a data indicating how much the level of the luminance signal is changed when the luminance signal is sampled in the horizontal direction, i.e., a data indicating how much contrast there is in the horizontal direction.

The horizontal-direction estimation value generating circuit 62 has a first horizontal-direction estimation value generating circuit 62a for generating a first horizontal-direction estimation value $E_1$, a second horizontal-direction estimation value generating circuit 62b for generating a second horizontal-direction estimation value $E_2$, a third horizontal-direction estimation value generating circuit 62c for generating a third horizontal-direction estimation value $E_3$, a fourth horizontal-direction estimation value generating circuit 62d for generating a fourth horizontal-direction estimation value $E_4$, a fifth horizontal-direction estimation value generating circuit 62e for generating a fifth horizontal-direction estimation value $E_5$, a sixth horizontal-direction estimation value generating circuit 62f for generating a sixth horizontal-direction estimation value $E_6$, a seventh horizontal-direction estimation value generating circuit 62g for generating a seventh horizontal-direction estimation value $E_7$, an eighth horizontal-direction estimation value generating circuit 62h for generating an eighth horizontal-direction estimation value $E_8$, a ninth horizontal-direction estimation value generating circuit 62i for generating a ninth horizontal-direction estimation value $E_9$, a tenth horizontal-direction estimation value generating circuit 62j for generating a tenth horizontal-direction estimation value $E_{10}$, an eleventh horizontal-direction estimation value generating circuit 62k for generating an eleventh horizontal-direction estimation value $E_{11}$, and a twelfth horizontal-direction estimation value generating circuit 62l for generating a twelfth horizontal-direction estimation value $E_{12}$.

Figure 3:
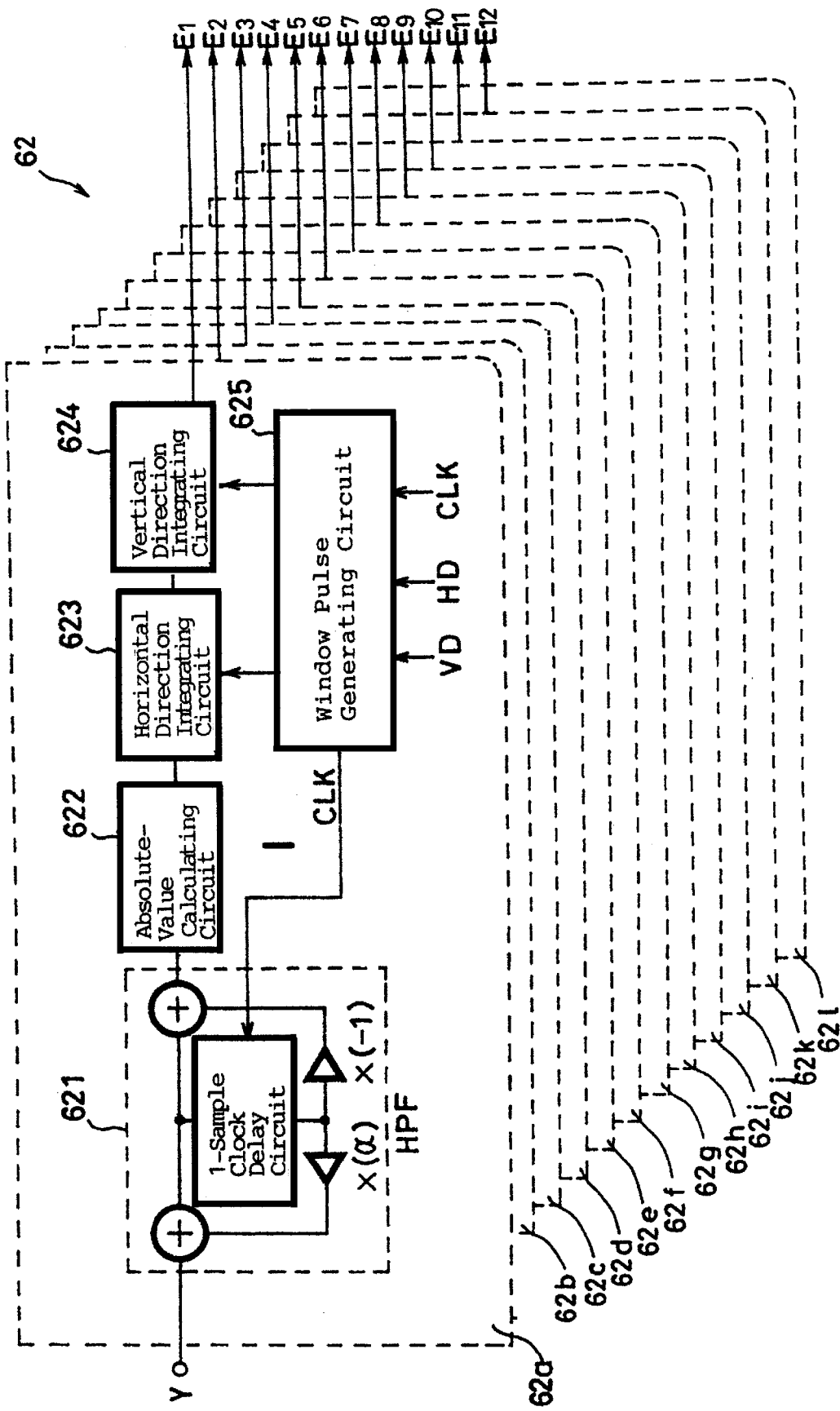
FIG. 3 is a diagram showing a specific arrangement of a horizontal-direction estimation value generating circuit 62.

A detailed arrangement of the horizontal-direction estimation value generating circuit 62 will hereinafter be described with reference to FIG. 3.

The first horizontal-direction estimation value generating circuit 62a of the horizontal-direction estimation value generating circuit 62 has a high-pass filter 621 for extracting a high-frequency component of the luminance signal, an absolute-value calculating circuit 622 for converting the extracted high-frequency component into an absolute value to thereby obtain a data having positive values only, a horizontal-direction integrating circuit 623 for integrating an absolute-value data in the horizontal direction to thereby cumulatively add the data of the high-frequency component in the horizontal direction, a vertical-direction integrating circuit 624 for integrating the data integrated in the vertical direction, and a window pulse generating circuit 625 for supplying an enable signal used for allowing integrating operations of the horizontal-direction integrating circuit 623 and the vertical-direction integrating circuit 624.

The high-pass filter 621 is formed of a one-dimension finite impulse response filter for filtering the high-frequency component of the luminance signal in response to one sample clock CLK from the window pulse generating circuit 625. The high-pass filter 621 has a cutoff frequency characteristic expressed by $$(1-Z^{-1})/(1-\alpha Z^{-1}) \tag{2}$$

The first horizontal-direction estimation value generating circuit 62a has a value of $\alpha=0.5$ and has a frequency characteristic corresponding to the value of $\alpha$.

The window pulse generating circuit 625 has a plurality of counters operated based on the clock signal VD representing one vertical period, on the clock signal HD representing one horizontal period and on the clock signal CLK representing one sample clock. The window pulse generating circuit 625 supplies the enable signal to the horizontal-direction integrating circuit 623 based at every one sample clock signal CLK and supplies the enable signal to the vertical-direction integrating circuit 624 at every one horizontal period based on the counted value of the counter. The window pulse generating circuit 625 of the first horizontal-direction estimation value circuit 62a has a counter whose count value is set so that a size of a window should be that of 192 pixels×60 pixels. Therefore, the first horizontal-direction estimation value $E_1$ output from the horizontal-direction estimation value generating circuit 62 indicates data obtained by integrating all the high-frequency components in the window of 192 pixels×60 pixels.

Similarly to the first horizontal-direction estimation value generating circuit 62a, each of the second to twelfth horizontal-direction estimation value generating circuits 62b to 62h has a high-pass filter 621, an absolute-value calculating circuit 622, a horizontal-direction integrating circuit 623, a vertical-direction integrating circuit 624, and a window pulse generating circuit 625. A different point among the respective circuits lies in that the respective circuits (62a to 62l) have different combinations of their filter coefficients α and their window sizes.

Therefore, the estimation values $E_1$ to $E_{12}$ generated by the respective circuits are different from one another.

FIG. 5 shows the filter coefficients α and the window sizes which are respectively set for the first horizontal-direction estimation value generating circuit 62a to the twelfth horizontal-direction estimation value generating circuit 62l. The reason for setting such different filter coefficients will hereinafter be described.

For example, the high-pass filter having a high cutoff frequency is very suitable for use when the lens is substantially in a just focus state (which means a state that a lens is in focus). The reason for this is that the estimation value is changed at a considerably large rate as compared with a lens movement in the vicinity of the just focus point. Since the estimation value is changed at a small rate when the lens is considerably out of focus, it is not too much to say that the high-pass filter having the high cutoff frequency is not suitable for use when the lens is considerably out of focus.

On the other hand, the high-pass filter having a low cutoff frequency is suitable for use when the lens is considerably out of focus. The reason for this is that when the lens is moved while being considerably out of focus, the estimation value is changed at a considerably large rate. Since the estimation value is changed at a small rate when the lens is moved in the substantial just focus state, then it is not too much to say that the high-pass filter having the low cutoff frequency is not suitable for use in the substantial just focus state.

In short, each of the high-pass filter having the high cutoff frequency and the high-pass filter having the low cutoff frequency has both of advantage and disadvantage. It is difficult to determine which of the high-pass filters is more suitable. Therefore, preferably, a plurality of high-pass filters having different filter coefficients are used and generate a plurality of estimation values in order to select a most proper estimation value.

Figure 6A:
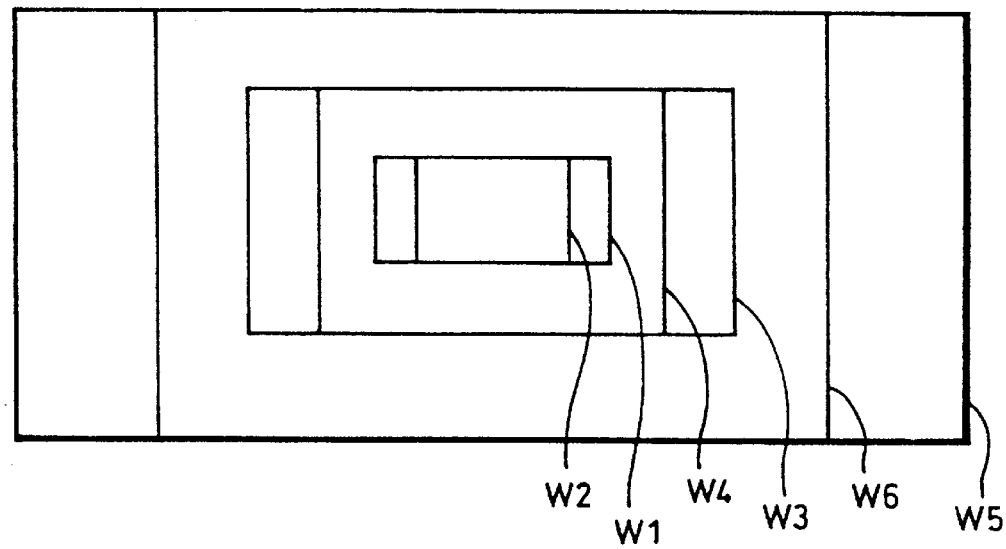
FIGS. 6A and 6B are diagrams used to explain the respective window sizes.
Figure 6B:
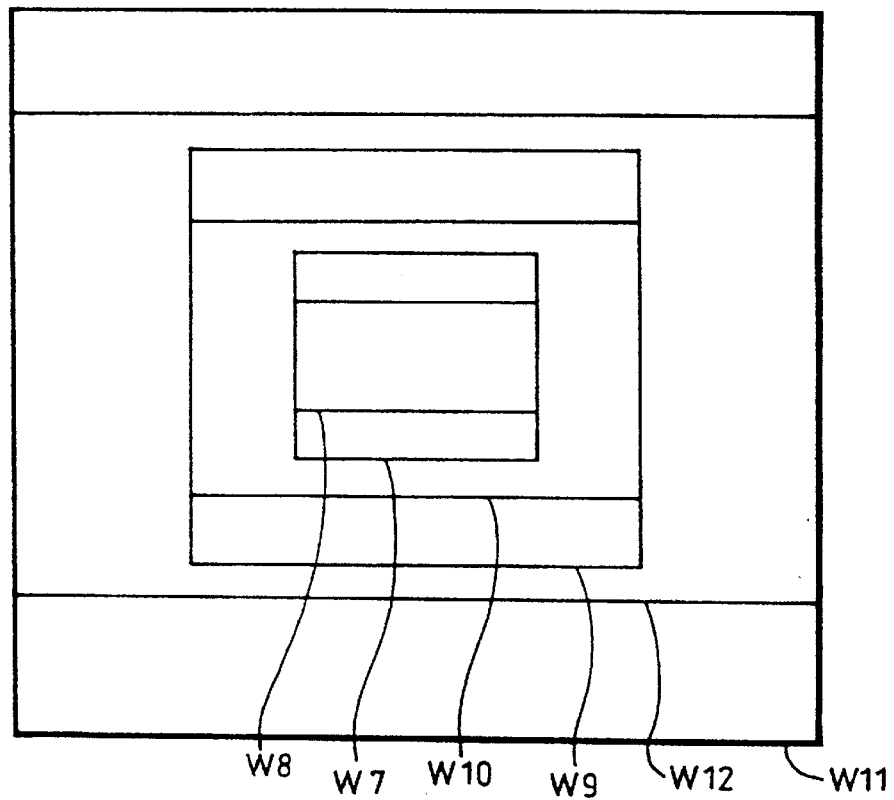

The horizontal-direction estimation value generating circuit 63 according to this embodiment has plural kinds of preset windows shown in FIG. 6A. A window W1 is a window of 192 pixels×60 pixels. A window W2 is a window of 132 pixels×60 pixels. A window W3 is a window of 384 pixels×120 pixels. A window W4 is a window of 264 pixels×120 pixels. A window W3 is a window of 768 pixels×120 pixels. A window W3 is a window of 548 pixels×120 pixels. FIG. 6B shows windows set in the vertical-direction estimation value generating circuit 62. A window W7 is a window of 120 pixels×80 pixels. A window W8 is a window of 120 pixels×60 pixels. A window W9 is a window of 240 pixels×160 pixels. A window W10 is a window of 240 pixels ×120 pixels. A window W3 is a window of 480 pixels×320 pixels. A window W3 is a window of 480 pixels×240 pixels.

It is possible to generate different estimation values corresponding to the respective windows by setting a plurality of windows as described above. Therefore, regardless of a size of an object to be brought into focus, it is possible to obtain a proper estimation value from any of the first horizontal-direction estimation value generating circuit 62a to the twelfth horizontal-direction estimation value generating circuit 621.

Figure 4:
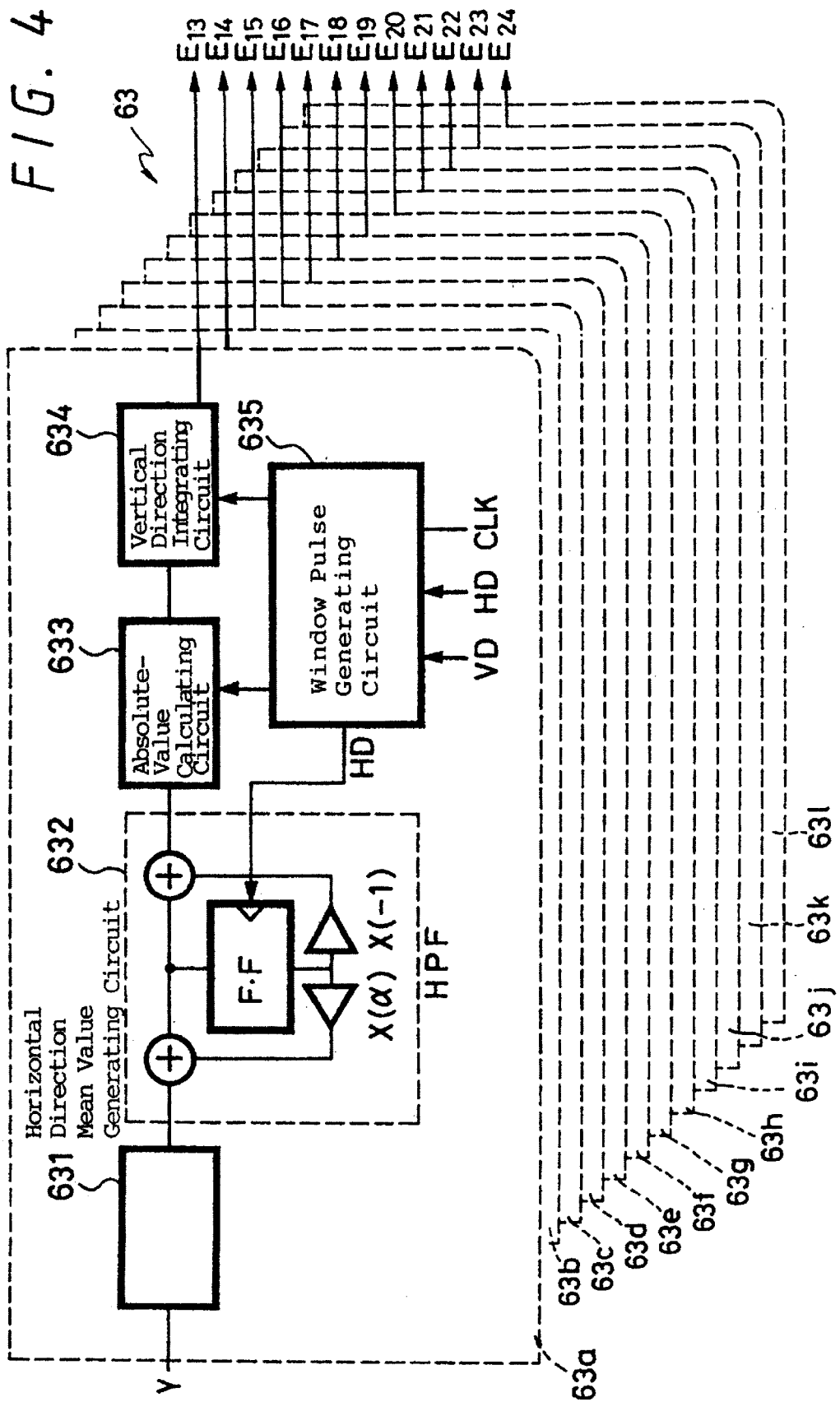
FIG. 4 is a diagram showing a specific arrangement of a vertical-direction estimation value generating circuit 63.

An arrangement of the vertical-direction estimation value generating circuit 63 will be described with reference to FIGS. 2 and 4.

The vertical-direction estimation value generating circuit 63 is a circuit for generating an estimation value in the vertical direction. The estimation value in the vertical direction is a data indicating how much the level of the luminance signal is changed when the luminance signal is sampled in the vertical direction, i.e., a data indicating how much there is the contrast in the vertical direction.

The vertical-direction estimation value generating circuit 62 has a first vertical-direction estimation value generating circuit 63a for generating a first vertical-direction estimation value $E_{13}$, a second vertical-direction estimation value generating circuit 63b for generating a second vertical-direction estimation value $E_{14}$, a third vertical-direction estimation value generating circuit 63c for generating a third vertical-direction estimation value $E_{15}$, a fourth vertical-direction estimation value generating circuit 63d for generating a fourth vertical-direction estimation value $E_{16}$, a fifth vertical-direction estimation value generating circuit 63e for generating a fifth vertical-direction estimation value $E_{17}$, a sixth vertical-direction estimation value generating circuit 63f for generating a sixth vertical-direction estimation value $E_{18}$, a seventh vertical-direction estimation value generating circuit 63g for generating a seventh vertical-direction estimation value $E_{19}$, an eighth vertical-direction estimation value generating circuit 63h for generating an eighth vertical-direction estimation value $E_{20}$, a ninth vertical-direction estimation value generating circuit 63i for generating a ninth vertical-direction estimation value $E_{21}$, a tenth vertical-direction estimation value generating circuit 63j for generating a tenth vertical-direction estimation value $E_{22}$, an eleventh vertical-direction estimation value generating circuit 63k for generating an eleventh vertical-direction estimation value $E_{23}$, and a twelfth vertical-direction estimation value generating circuit 63l for generating a twelfth vertical-direction estimation value $E_{24}$.

A detailed arrangement of the vertical-direction estimation value generating circuit 63 will hereinafter be described with reference to FIG. 4.

The first vertical-direction estimation value generating circuit 63a of the vertical-direction estimation value generating circuit 63 has a horizontal-direction mean value generating circuit 631 for generating a mean value data of levels of luminance signals in the horizontal direction, a high-pass filter 632 for extracting a high-frequency component of the mean-value data of the luminance signals, an absolute-value calculating circuit 633 for converting the extracted high-frequency component into an absolute value to thereby obtain a data having positive values only, a vertical-direction integrating circuit 634 for integrating an absolute-value data in the vertical direction to thereby cumulatively add the data of the high-frequency component in the vertical direction, and a window pulse generating circuit 635 for supplying an enable signal used for allowing integrating operations of the horizontal-direction mean value generating circuit 631 and the vertical-direction integrating circuit 634.

The high-pass filter 632 is formed of a one-dimension finite impulse response filter for filtering the high-frequency component of the luminance signal in response to one horizontal period signal HD from the window pulse generating circuit 625. The high-pass filter 632 has the same cutoff frequency characteristic as that of the high-pass filter 621 of the first horizontal-direction estimation value generating circuit 62a. The first vertical-direction estimation value generating circuit 63a has a value of $\alpha=0.5$ and has a frequency characteristic corresponding to the value of $\alpha$.

The window pulse generating circuit 635 has a plurality of counters operated based on the clock signal VD representing one vertical period, the clock signal HD representing one horizontal period and the clock signal CLK representing one sample clock supplied from the CPU 4. The window pulse generating circuit 635 supplies the enable signal to the horizontal-direction mean value generating circuit 631 based on the counted value of the counter at every one sample clock signal CLK and supplies the enable signal to the vertical-direction integrating circuit 634 at every one horizontal period. The window pulse generating circuit 635 of the first vertical-direction estimation value circuit 63a has a counter whose count value is set so that a size of a window should be that of 120 pixels×80 pixels. Therefore, the first vertical-direction estimation value $E_{13}$ output from the vertical-direction estimation value generating circuit 63 indicates data obtained by integrating all the high-frequency components in the window of 120 pixels×80 pixels.

Similarly to the above first vertical-direction estimation value generating circuit 63a, each of the second to twelfth vertical-direction estimation value generating circuits 63b to 631h has a horizontal-direction mean value generating circuit 631, a high-pass filter 632, an absolute-value calculating circuit 633, a vertical-direction integrating circuit 634, and a window pulse generating circuit 635. A different point among the respective circuits lies in that the respective circuits have different combinations of their filter coefficients α and their window sizes similarly to those of the horizontal-direction estimation value generating circuit 62.

Therefore, the estimation values $E_1$ to $E_{12}$ generated by the respective circuits are different from one another.

FIG. 5B shows the filter coefficients α and the window sizes both of which are respectively set for the first vertical-direction estimation value generating circuit 62a to the twelfth horizontal-direction estimation value generating circuit 62l.

The vertical-direction estimation value generating circuit 63 according to this embodiment has plural kinds of preset windows shown in FIG. 6B. A window W7 is a window of 120 pixels×80 pixels. A window W8 is a window of 120 pixels×60 pixels. A window W9 is a window of 240 pixels× 160 pixels. A window W10 is a window of 240 pixels×120 pixels. A window W3 is a window of 480 pixels×320 pixels. A window W3 is a window of 480 pixels×240 pixels.

It is possible to generate different estimation values corresponding to the respective combinations of filter coefficients and windows by providing circuits having a plurality of filter characteristics and a plurality of windows as described above. Therefore, since the estimation value is totally generated from a plurality of estimation values regardless of an image pickup state of an object to be brought into focus, it is possible to obtain a precise total estimation value even if any one of the estimation values is not proper.

Therefore, according to this embodiment, since the focus control circuit has twenty-four estimation value generating circuits for generating twenty-four kinds of estimation values obtained from combination of twelve window sizes and two filter coefficients, it is possible to obtain plural kinds of estimation values. Moreover, since the estimation value is totally obtained based on the respective estimation values, it is possible to improve the accuracy of the estimation value.

The microcomputer 64 will be described with respect to FIGS. 2 and 7.

The microcomputer 64 is a circuit for receiving twenty-four estimation values $E_1$ to $E_{24}$ generated by the horizontal-direction estimation value generating circuit 62 and the vertical-direction estimation value generating circuit 63 and for calculating, based on these twenty-four estimation values, the direction in which the lens is to be moved and a lens position where the estimation value is maximum, i.e., a lens position where the lens is in focus.

The microcomputer 64 has a ROM 65 which stores a program used for calculating the twenty-four estimation values in accordance with a predetermined flowchart. As shown in FIG. 7, the ROM 65 stores twenty-four weight data Wi corresponding to the respective twenty-four estimation values $E_i$ (i=1, 2, . . . 24) output from the twenty-four estimation value generating circuits (62a to 62l and 63a to 63l). These weight data $W_i$ are data used for giving priority to the twenty-four estimation values $E_i$. The higher values the weight data Wi have, the higher priority the corresponding estimation value Ei have. The weight data $W_i$ have fixed values preset upon shipment from a factory.

The microcomputer 64 has a RAM 66 for storing the twenty-four estimation values $E_i$ (i=1, 2, . . . 24) respectively supplied from the twenty-four estimation value generating circuits (62a to 62l and 63a to 63l) in connection with the position of the focus lens. It is assumed that estimation values generated when the lens is located at a position $X_1$ are represented by $E_1(X_1)$ to $E_{24}(X_1)$. Initially, the estimation values $E_1(X_1)$ to $E_{24}(X_1)$ generated when the lens is located at a position $X_1$ are stored in the RAM 66. Further, when the lens is moved from the position $X_1$ to a position $X_2$, estimation values $E_1(X_2)$ to $E_{24}(X_2)$ generated when the lens is moved to the position $X_2$ are stored in a RAM 66. Since the RAM 66 stores data in a ring buffer system, the previously stored estimation values $E_1(X_1)$ to $E_{24}(X_1)$ are not erased until the RAM becomes full of stored data. These estimation values $E_i$ are stored in the RAM 64 when designation of a pointer by the microcomputer 64.

An autofocus operation will be described with reference to FIGS. 8 to 13 which are flowcharts therefor and FIG. 14.

A focus mode is shifted from a manual focus mode to an autofocus mode when a camera man presses an autofocus button provided in an operation button 5. The autofocus mode includes a continuous mode in which the autofocus mode is continued after the button is pressed until a command of mode shift to the manual focus mode is issued, and a non-continuous mode in which, after an object is brought into focus, the autofocus mode is stopped and the mode is automatically shifted to the manual focus mode. The continuous mode will be described in the following explanation with reference to the flowcharts. In processings in steps S100 to S131, it is determined to which direction the lens is to be moved. In processings in steps S201 to S221, the lens position is calculated so that the estimation value should be maximum.

Figure 14:
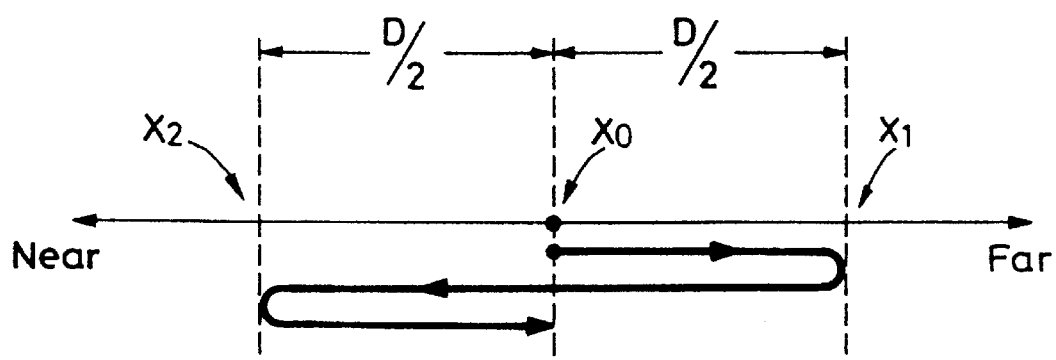
FIG. 14 is a diagram showing a movement of a lens when a lens movement direction is determined in order to focus the lens on an object.

As shown in FIG. 14, in steps S100 to S104, based on a command from the CPU 4, the focus lens is moved to the position $X_1$ which is distant in the Far direction from an initial lens position $X_0$ by a distance of D/2, subsequently moved to a position $X_2$ which is distant in the Near direction from the position $X_1$ by a distance of D, and then moved to a position which is distant from the position $X_2$ in the Far direction by a distance of D/2, i.e., returned to the initial lens position $X_0$. The Near direction depicts a direction in which the lens is moved toward the imaging devices, and the Far direction depicts a direction in which the lens is moved away from the imaging devices. Reference symbol D depicts a focal depth. The microcomputer 64 stores in the RAM 66 the estimation values $E_i(X_0)$, the estimation values $E_t(X_1)$, and the estimation values $E_t(X_2)$ generated in the horizontal-direction estimation value generating circuit 62 and the vertical-direction estimation value generating circuit 63.

The reason for preventing the focus lens from being moved from the position $X_0$ by a distance exceeding D/2 will be described. The focal depth is a data indicating a range within which the lens is in focus around a focus point. Therefore, even if the focus lens is moved within the range of the focal depth, then it is impossible for a man to recognize deviation of focus resulting from such movement. Contrary, when the lens is moved from the position $X_1$ to the position $X_2$, if the lens is moved by a distance exceeding the focal depth, then deviation of the focus resulting from the movement influences the video signal obtained by image pickup. Specifically, when a maximum movement amount of the lens is set within the focal depth, the deviation of the focus cannot be recognized.

The processing in each of steps S100 to S104 will be described in detail with reference to FIG. 4.

In step S100, the microcomputer 64 stores in the RAM 66 the estimation values $E_1(X_0)$ to the estimation values $E_{24}(X_0)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Far direction by a distance of D/2.

In step S101, the CPU 4 outputs a command to the focus-lens motor drive circuit 12c to move the focus lens in the Far direction by a distance of D/2.

In step S102, the microcomputer 64 stores in the RAM 66 the estimation values $E_1(X_1)$ to the estimation values $E_{24}(X_1)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Near direction by a distance of D.

In step S103, the CPU 4 outputs a command to the focus-lens motor drive circuit 12c to move the focus lens in the Near direction by a distance of D.

In step S104, the microcomputer 64 stores in the RAM 66 the estimation values $E_1(X_2)$ to the estimation values $E_{24}(X_2)$ newly generated by the horizontal-direction estimation value generating circuit 62 and the vertical-direction estimation value generating circuit 63. After finishing storing the above estimation values, the microcomputer 64 issues to the CPU 4 a command to move the focus lens in the Near direction by a distance of D/2.

Therefore, when the processing in step S104 is finished, the estimation values $E_1(X_0)$ to the estimation values $E_{24}(X_0)$ generated when the lens is located at the position $X_0$, the estimation values $E_1(X_1)$ to the estimation values $E_{24}(X_1)$ generated when the lens is located at the position $X_1$, and the estimation values $E_1(X_2)$ to the estimation values $E_{24}(X_2)$ generated when the lens is located at the position $X_0$ are stored in the RAM 66 of the microcomputer 64.

Processings in steps S105 to S115 are processings for selecting an improper estimation value from the twenty-four estimation values.

Figure 15A:
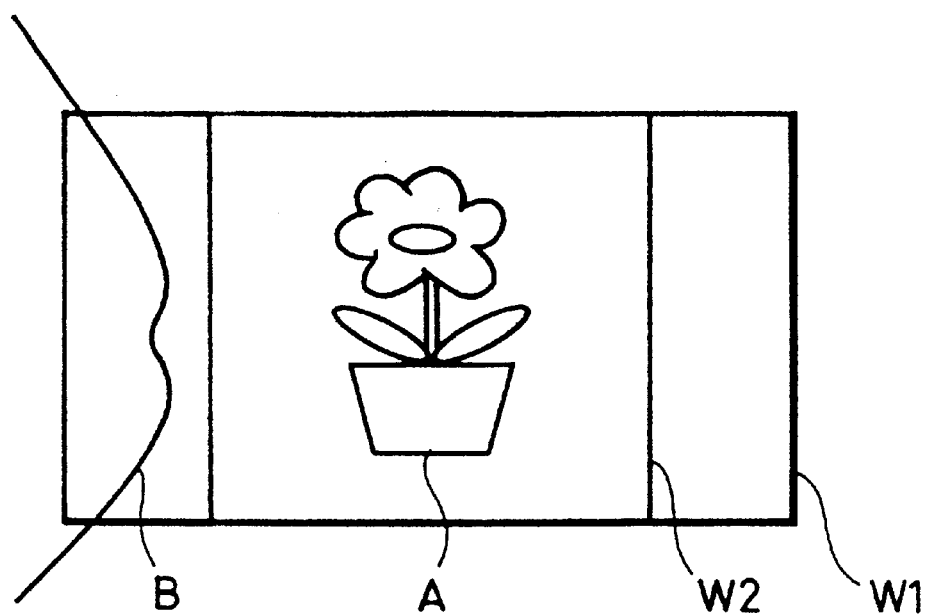
FIGS. 15A and 15B are diagrams showing a state that a non-target object lies in a window.
Figure 15B:
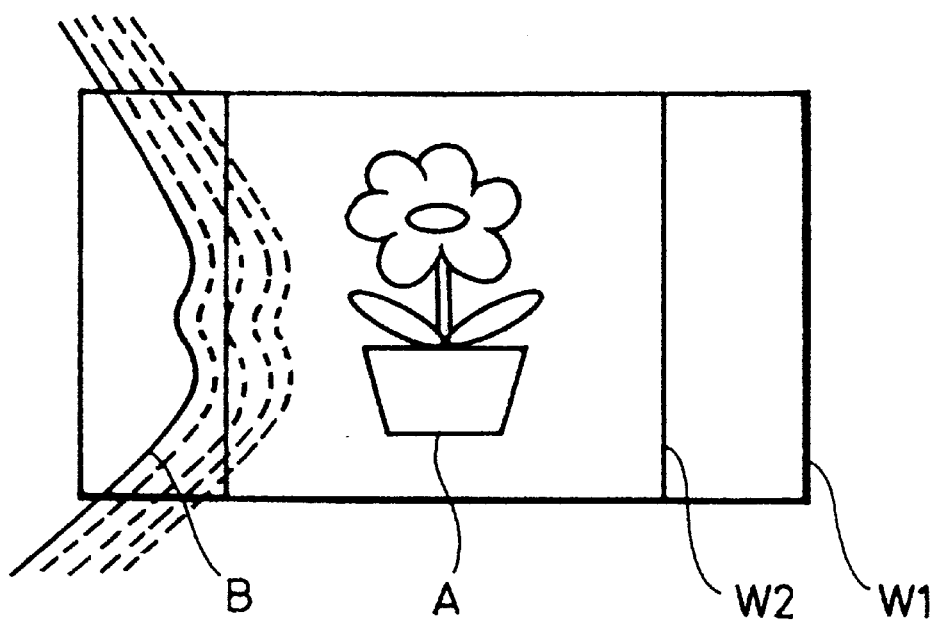
Figure 16:
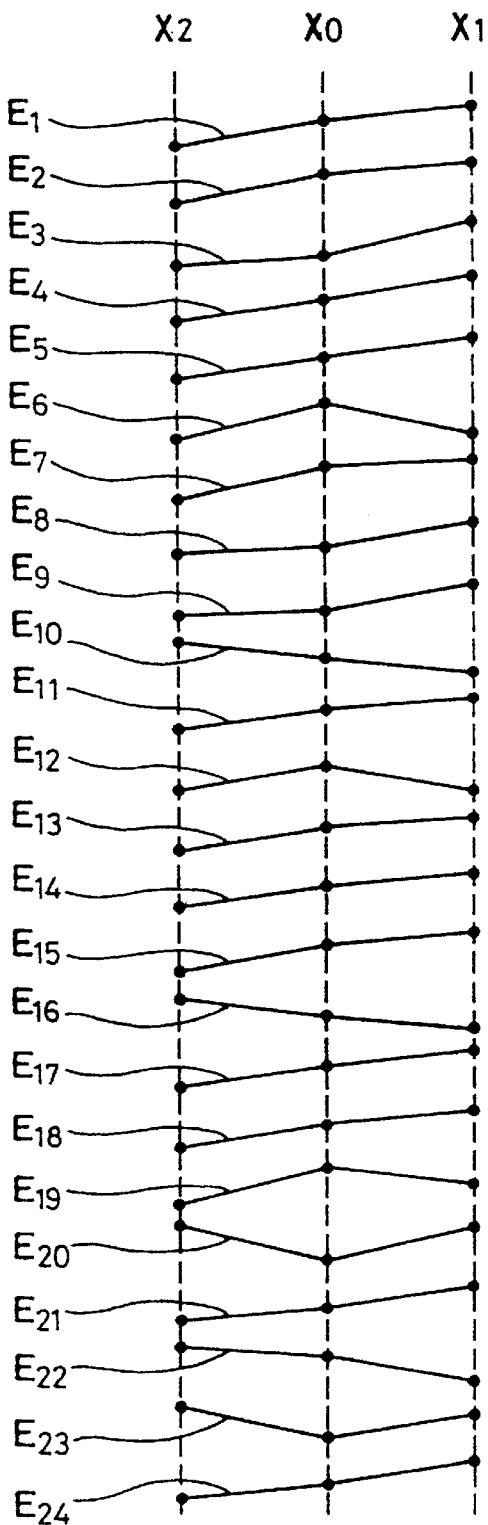
FIG. 16 is a diagram showing fluctuation of estimation values stored in a RAM 66 when the lens movement direction is determined.

A basic concept of operations in steps S105 to S115 will be described with reference to FIG. 15A and FIG. 15B. FIGS. 15A and 15B show that a target object A to be brought into focus is imaged in a window W2 and a non-target object B having high contrast and located on the front side of the target object A is imaged in a window W1 but outside of the window W2. At this time, since the object B exists within the window W1, the estimation value $E_1$ generated by the first horizontal-direction estimation value generating circuit 62a having a preset window size value of the window W1 inevitably includes high-frequency components resulting from the object B and hence is improper as the estimation value of the object A. Therefore, the estimation value $E_1$ inevitably becomes considerably large as compared with the estimation value $E_2$ generated by the second horizontal-direction estimation value generating circuit 62b having the preset value of the window W2. Similarly, the estimation value $E_7$ generated by the seventh horizontal-direction estimation value generating circuit 62g having a preset window size value of the window W1 inevitably includes high-frequency components resulting from the object B and hence is improper as the estimation value of the object A. Therefore, the estimation value $E_7$ inevitably becomes considerably large as compared with the estimation value $E_8$ generated by the eighth horizontal-direction estimation value generating circuit 62h having the preset value of the window W2.

It is not always determined that the estimation value $E_2$ or the estimation value $E_8$ is proper on the basis of only the fact that the non-target object B does not exist in the window W2. The reason for this will be described with reference to FIG. 15B. FIG. 15B shows windows obtained when the lens is moved so as to be focused on the object A. The more the lens is adjusted so as to be focused on the object A, the more the lens becomes considerably out of focus with respect to the object B. When the lens becomes considerably out of focus with respect to the object B, an image of the object B becomes blurred considerably and the blurred image thereof enters the window W2. Therefore, in a state shown in FIGS. 15A and 15B, the estimation value $E_2$ generated by the second horizontal-direction estimation value generating circuit 62b having the preset value of the window W2 is not always proper. Similarly, the estimation value $E_8$ generated by the eighth horizontal-direction estimation value generating circuit 62h having the preset value of the window W2 is not always proper.

As described above, in order to determine whether or not the estimation values $E_1$ and $E_7$ obtained from the window W1 and the estimation values $E_2$ and $E_8$ obtained from the window W2 are proper, it is sufficient to discriminate whether or not $$|E_1-E_2| \leq E_1 \times \beta$$

and $$|E_7-E_8| \leq E_7 \times \beta \quad (3)$$

are satisfied. $\beta$ is a coefficient previously set based on an experimental result. While in this embodiment the value thereof is set to $\beta=0.01$, if predetermined values obtained from experiments are used instead of $(E_1 \times \beta)$ and $(E_7 \times \beta)$, it is possible to obtain the same result without $(E_1 \times \beta)$ and $(E_7 \times \beta)$ being used in the equation (3).

In the determination based on the calculated result of the equation (3), if both of values of $|E_1-E_2|$ and $|E_7-E_8|$ are smaller than a predetermined value, then it can be determined that there is almost no difference between the estimation values $E_1$ and $E_2$ and it can be determined that there is almost no difference between the estimation values $E_7$ and $E_8$. Therefore, it is determined that there is no object such as the non-target object B shown in FIG. 15. If both of values of $|E_1-E_2|$ and $|E_7-E_8|$ are larger than a predetermined value, then it can be determined that there is some difference between the estimation values $E_1$ and $E_2$ and it can be determined that there is some difference between the estimation values $E_7$ and $E_8$. Therefore, it is determined that there is an object such as the non-target object B shown in FIG. 15. Specifically, when the equation (3) is calculated, if the equation (3) is satisfied, then the estimation values $E_1$ and $E_2$ and the estimation values $E_7$ and $E_8$ are proper. If on the other hand the equation (3) is not satisfied, then each of the estimation values $E_1$ and $E_2$ and the estimation values $E_7$ and $E_8$ is not proper.

Figure 8:
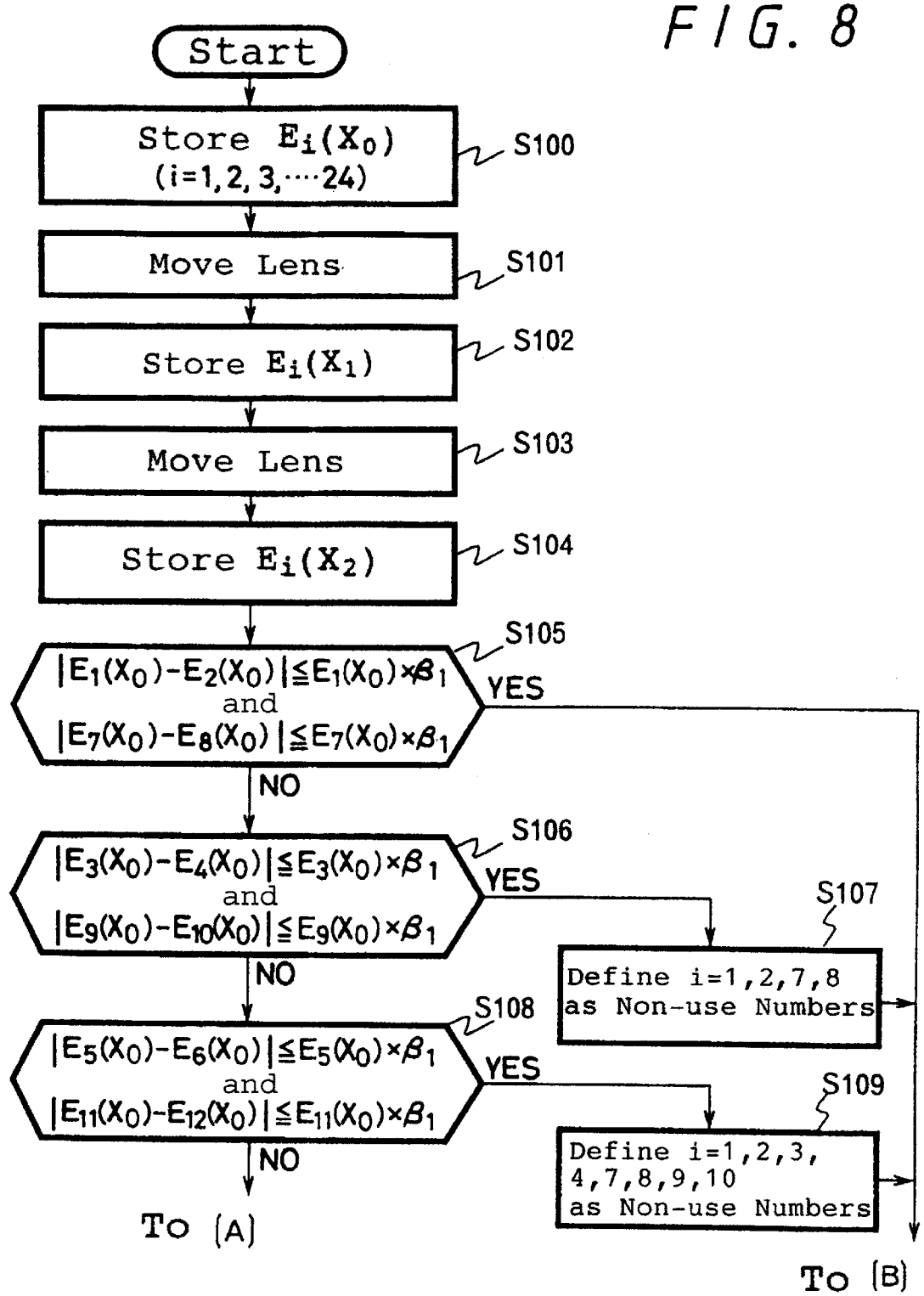
FIGS. 8 to 13 are flowcharts used to explain an autofocus operation.
Figure 9:
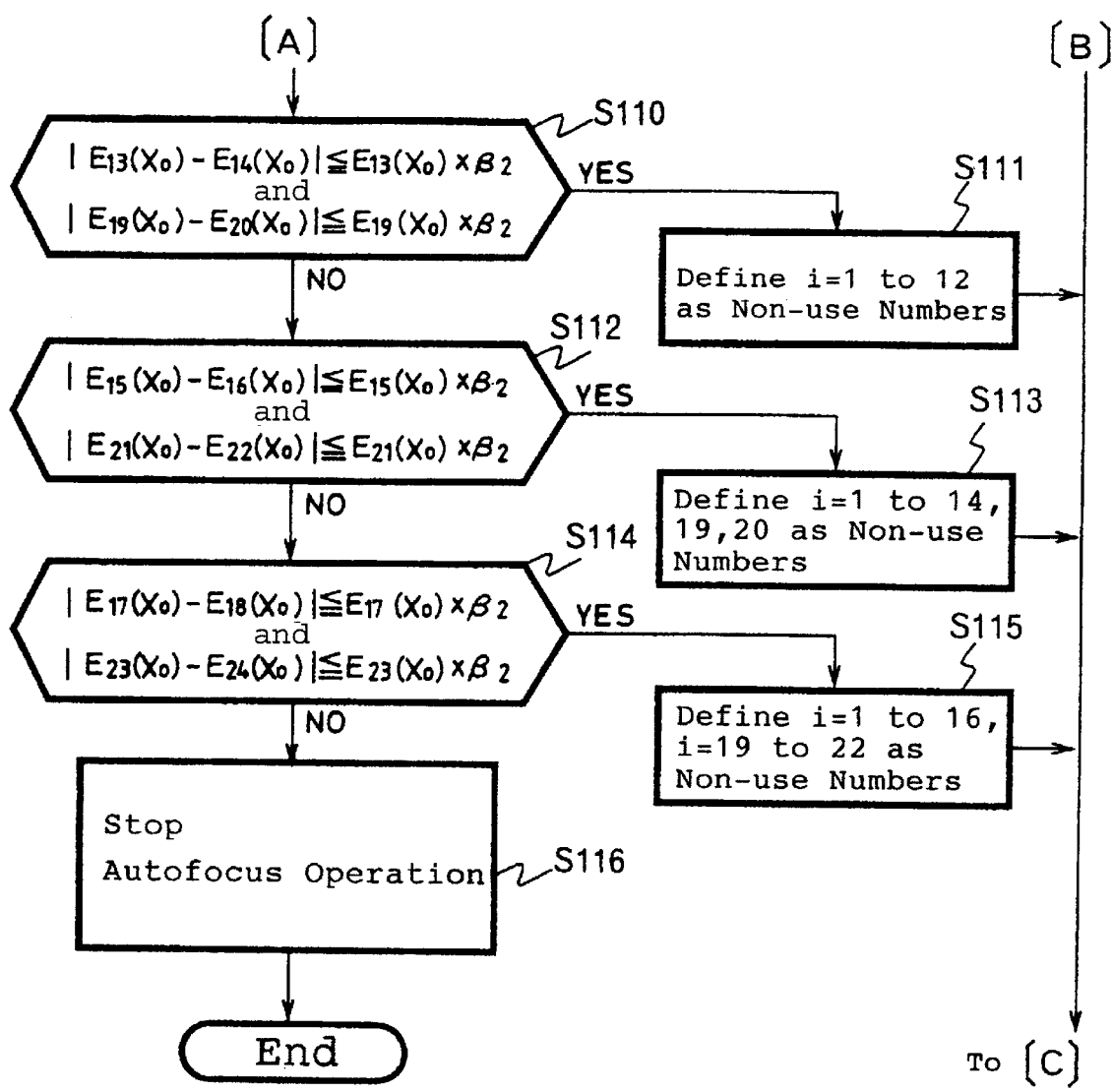

In consideration of the above basic concept, the processings in steps S105 to S115 will specifically be described with reference to FIGS. 8 and 9.

In step S105, it is determined by using the estimation values $E_1(X_0)$ to $E_{24}(X_0)$ obtained when the lens is located at the position $X_0$ whether or not $$|E_1(X_0)-E_2(X_0)| \leq E_1(X_0) \times \beta_1$$

and $$|E_7(X_0)-E_8(X_0)| \leq E_7(X_0) \times \beta_1 \quad (105)$$

are satisfied. If the estimation values $E_1$, $E_2$, $E_7$, $E_8$ satisfy the equation (105), then it is determined that the estimation values $E_1$, $E_2$, $E_7$, $E_8$ are proper values, and then the processing proceeds to step S117. If on the other hand the estimation values $E_1$, $E_2$, $E_7$, $E_8$ do not satisfy the equation (105), then it is determined that at least the estimation values $E_1$, $E_2$, $E_7$, $E_8$ are improper values, and then the processing proceeds to step S106.

Since it is determined based on the calculated result of step S105 that the estimation values $E_1$, $E_2$, $E_7$, $E_8$ are improper, in step S106, the estimation values $E_3$ and $E_9$ obtained from the window W3 which is a large window next to the window W1 are used and the estimation values $E_4$ and $E_{10}$ obtained from the window W4 which is a large window next to the window W2 are used.

In step S106, similarly to step S105, it is determined by using the estimation values $E_1(X_0)$ to $E_{24}(X_0)$ obtained when the lens is located at the position $X_0$ whether or not $$|E_3(X_0)-E_4(X_0)| \leq E_3(X_0) \times \beta_1$$

and $$|E_9(X_0)-E_{10}(X_0)| \leq E_9(X_0) \times \beta_1 \quad (106)$$

are satisfied. If the estimation values $E_3$, $E_4$, $E_9$, $E_{10}$ satisfy the equation (106), then it is determined that the estimation values $E_3$, $E_4$, $E_9$, $E_{10}$ are proper values, and then the processing proceeds to step S107. If on the other hand the estimation values $E_3$, $E_4$, $E_9$, $E_{10}$ do not satisfy the equation (106), then it is determined that at least the estimation values $E_3$, $E_4$, $E_9$, $E_{10}$ are improper values, and then the processing proceeds to step S108.

The reason for employing the windows W3 and W4 having larger sizes will be described. As described above, since the estimation values $E_1$ and $E_2$ and the estimation values $E_7$ and $E_8$ are improper in the state shown in FIG. 14, it is impossible to bring either the target object A or the non-target object B into focus. However, when the windows W3 and W4 larger than the windows W1 and W2 are used, it is considered that the non-target object B lies in the range of the window W4. If the whole non-target object B lies within the window W4, then difference between the estimation value $E_3$ and the estimation value $E_4$ becomes small and difference between the estimation value $E_9$ and the estimation value $E_{10}$ becomes small. Specifically, it is determined that the estimation values $E_3$, $E_4$, $E_9$, and $E_{10}$ satisfy the equation (106). As a result, since the estimation values $E_3$, $E_4$, $E_9$, and $E_{10}$ become proper values, the non-target object B is brought into focus. Indeed, the lens should be focused on the target object A. But, if the lens is adjusted so as to be focused on the object A, then it is impossible to obtain the proper estimation values. As a result, the autofocus control circuit 34 repeatedly executes the processing of a control loop and keeps the focus lens moving for a long time. Therefore, while the autofocus control circuit repeatedly executes the control loop, the video signal indicative of a blurred image must continuously be output. However, if the lens is focused on the non-target object B, then it is possible to prevent the video signal indicative of the blurred image from being output continuously by repeating the control loop for a long period of time.

In step S107, numbers of i=1, 2, 7, 8 are defined as non-use numbers based on the result in step S105 that the estimation values $E_1$, $E_2$, $E_7$, and $E_8$ are improper values and on the result in step S106 that the estimation values $E_3$, $E_4$, $E_9$, and $E_{10}$ are proper values. Then, the processing proceeds to step S117. Since in step S107 the numbers of i=1, 2, 7, 8 are defined as the non-use numbers, the estimation values $E_1$, $E_2$, $E_7$, and $E_8$ will not be used in step S107 and the succeeding steps.

In step S108, since it is determined based on the result of the calculation in step S106 that the estimation values $E_3$, $E_4$, $E_9$, and $E_{10}$ are improper, the estimation values $E_5$ and $E_{11}$, obtained from the window W5 which is large next to the window W3 are used and the estimation values $E_6$ and $E_{12}$ obtained from the window W6 which is large next to the window W4 are used.

In step S108, similarly to step S106, it is determined by using the estimation values $E_1(X_0)$ to $E_{24}(X_0)$ generated when the lens is located at the position $X_0$, whether $$|E_5(X_0)-E_6(X_0)| \leq E_5(X_0) \times \beta_1$$

and $$|E_{11}(X_0)-E_{12}(X_0)| \leq E_{11}(X_0) \times \beta_1 \quad (108)$$

are satisfied. If the estimation values $E_5$, $E_6$, $E_{11}$, $E_{12}$ satisfy the equation (108), then it is determined that the estimation values $E_5$, $E_6$, $E_{11}$, $E_{12}$ are proper values, and then the processing proceeds to step S109. If on the other hand the estimation values $E_5$, $E_6$, $E_{11}$, $E_{12}$ do not satisfy the equation (108), then it is determined that at least the estimation values $E_5$, $E_6$, $E_{11}$, $E_{12}$ are improper values, and then the processing proceeds to step S110.

In step S109, only numbers of i=1, 2, 31 4, 7, 8, 9, 10 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, and on the result in step S108 that the estimation values $E_5$, $E_6$, $E_{11}$, and $E_{12}$ are proper values. Then, the processing proceeds to step S117. Since in step S109 the numbers of i=1, 2, 3, 4, 7, 8, 9, 10 are defined as the non-use numbers, the estimation values $E_1$, $E_2$, $E_3$, $E_4$, $E_7$, $E_8$, $E_9$ and $E_{10}$ will not be used in step S109 and the succeeding steps.

In step S108, since it is determined based on the result of the calculation in step S106 tha t the estimation values $Et_3$, $E_4$, $E_9$, and $E_{10}$ are improper, the estimation values $E_5$ and $E_{11}$ obtained from the window W5 which is large next to the window W3 are used and the estimation values $E_6$ and $E_{12}$ obtained from the window W6 which is large next to the window W4 are used.

In step S110, similarly to step S108, it is determined by using the estimation values $E_1(X_0)$ to $E_{24}(X_0)$ generated when the lens is locate at the position $X_0$, whether $$|E_{13}(X_0)-E_{14}(X_0)| \leq E_{13}(X_0) \times \beta_2$$

and $$|E_{19}(X_0)-E_{20}(X_0)| \leq E_{19}(X_0) \times \beta_2 \quad (110)$$

are satisfied. If the estimation values $E_{13}$, $E_{14}$, $E_{19}$, $E_{20}$ satisfy the equation (110), then it is determined that the estimation values $E_{13}$, $E_{14}$, $E_{19}$, $E_{20}$ are proper values, and then the processing proceeds to step S111. If on the other hand the estimation values $E_{13}$, $E_{14}$, $E_{19}$, $E_{20}$ do not satisfy the equation (110), then it is determined that at least the estimation values $E_{13}$, $E_{14}$, $E_{19}$, $E_{20}$ are improper values, and then the processing proceeds to step S112.

In step S111, only numbers of i=1 to 12 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_{11}$, and $E_{12}$ are improper values, and on the result in step S110 that the estimation values $E_{13}$, $E_{14}$, $E_{19}$, and $E_{20}$ are proper values. Then, the processing proceeds to step S117. Since in step S111 the numbers of i=1 to 12 are defined as the non-use numbers, the estimation values $E_1$ to $E_{12}$ will not be used in step S111 and the succeeding steps.

In step S112, similarly to step S110, it is determined by using the estimation values $E_1(X_0)$ to $E_{24}(X_0)$ generated when the lens is located at the position $X_0$, whether $$|E_{15}(X_0)-E_{16}(X_0)| \leq E_{15}(X_0) \times \beta_2$$

and $$|E_{21}(X_0)-E_{22}(X_0)| \leq E_{21}(X_0) \times \beta_2 \qquad (112)$$

are satisfied. If the estimation values $E_{15}$, $E_{16}$, $E_{21}$, $E_{22}$ satisfy the equati on (112), the n it is determined that the estimation values $E_{15}$, $E_{16}$, $E_{21}$, $E_{22}$ are proper values, and then the processing proceeds to step S113. If on the other hand the estimation values $E_{15}$, $E_{16}$, $E_{21}$, $E_{22}$ do not satisfy the equation (112), then it is determined that at least the estimation values $E_{15}$, $E_{16}$, $E_{21}$, $E_{22}$ are improper values, and then the processing proceeds to step S114.

In step S113, only numbers of i=1 to 14, 19 and 20 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_{11}$, and $E_{12}$ are improper values, on the result in step S110 that the estimation values $E_{13}$, $E_{14}$, $E_{19}$, and $E_{20}$ are improper values, and on the result in step S112 that the estimation values $E_{15}$, $E_{16}$, $E_{21}$, and $E_{22}$ are proper values. Then, the processing proceeds to step S117. Since in step S113 the numbers of i=1 to 12, 19 and 20 are defined as the non-use numbers, the estimation values $E_1$ to $E_{14}$, $E_{19}$ and $E_{20}$ will not be used in step S113 and the succeeding steps.

In step a114, similarly to step S110, it is determined by using the estimation values $E_1(X_0)$ to $E_{24}(X_0)$ generated when the lens is located at the position $X_0$, whether $$|E_{17}(X_0)-E_{18}(X_0)| \leq E_{17}(X_0) \times \beta_2$$

and $$|E_{23}(X_0)-E_{24}(X_0)| \leq E_{23}(X_0) \times \beta_2 \qquad (114)$$

are satisfied. If the estimation values $E_{17}$, $E_{18}$, $E_{23}$, $E_{24}$ satisfy the equation (114), then it is determined that the estimation values $E_{17}$, $E_{18}$, $E_{23}$, $E_{24}$ are proper values, and then the processing proceeds to step S115. If on the other hand the estimation values $E_{17}$, $E_{18}$, $E_{23}$, $E_{24}$ do not satisfy the equation (114), then it is determined that at least the estimation values $E_{17}$, $E_{18}$, $E_{23}$, $E_{24}$ are improper values, and then the processing proceeds to step S116.

In step S115, only numbers of i=1 to 16 and 19 to 22 are defined as non-use numbers based on the result in step S105 that the estimation values $E_1$, $E_2$, $E_7$, and $E_8$ are improper values, on the result in step S106 that the estimation values $E_3$, $E_4$, $E_9$, and $E_{10}$ are improper values, on the result in step S108 that the estimation values $E_5$, $E_6$, $E_1$, and $E_{12}$ are improper values, on the result in step S110 that the estimation values $E_{13}$, $E_{14}$, $E_{19}$, and $E_{20}$ are improper values, on the result in step S112 that the estimation values $E_{15}$, $E_{16}$, $E_{21}$, and $E_{22}$ are improper values, and on the result in step S114 that the estimation values $E_{17}$, $E_{18}$, $E_{23}$, and $E_{24}$ are proper values. Then, the processing proceeds to step S117. Since in step S115 the numbers of i=1 to 16 and 19 to 22 are defined as the non-use numbers, the estimation values $E_1$ to $E_{16}$ and $E_{19}$ to $E_{22}$ will not be used in step S115 and the succeeding steps.

When the processing reaches step S116, it is inevitably determined that all the estimation values $E_1$ to $E_{24}$ are improper. Therefore, it is determined that the autofocus operation cannot be carried out. Then, the mode is shifted to the manual focus mode and the processing is ended.

Then, the processings in steps for selecting the improper estimation values from the twenty-four estimation values is e nded.

Figure 10:
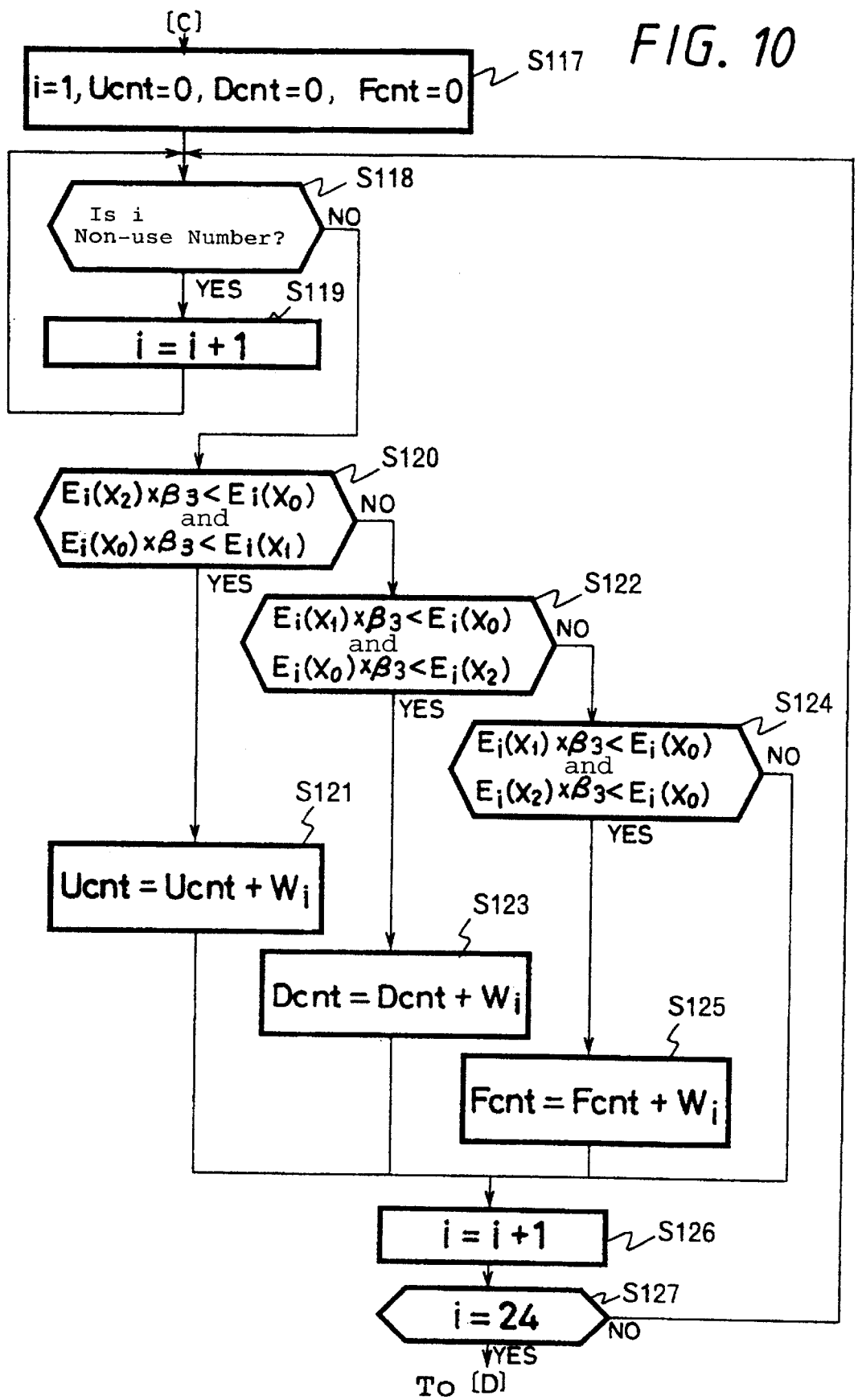
Figure 11:
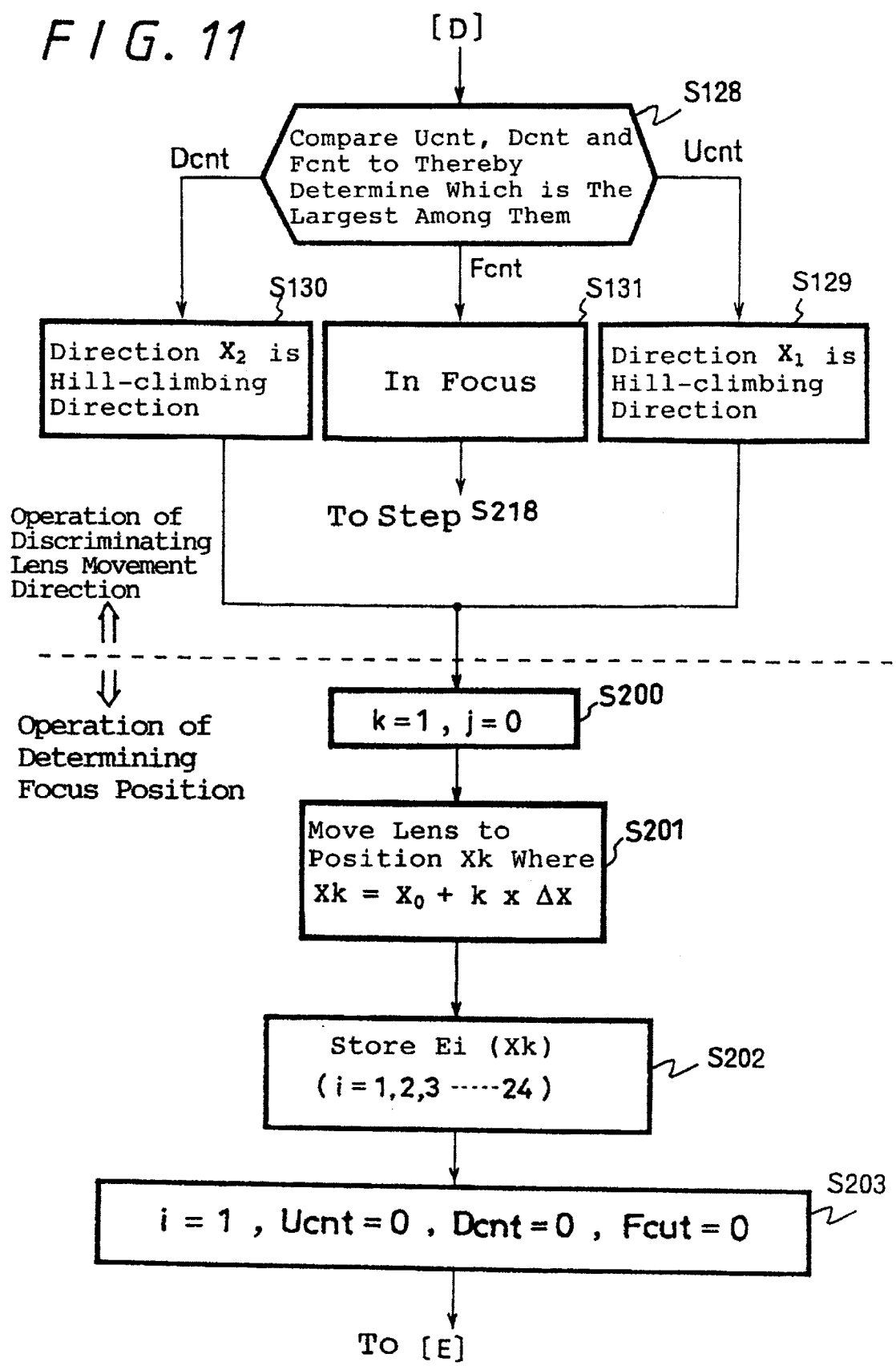
Figure 12:
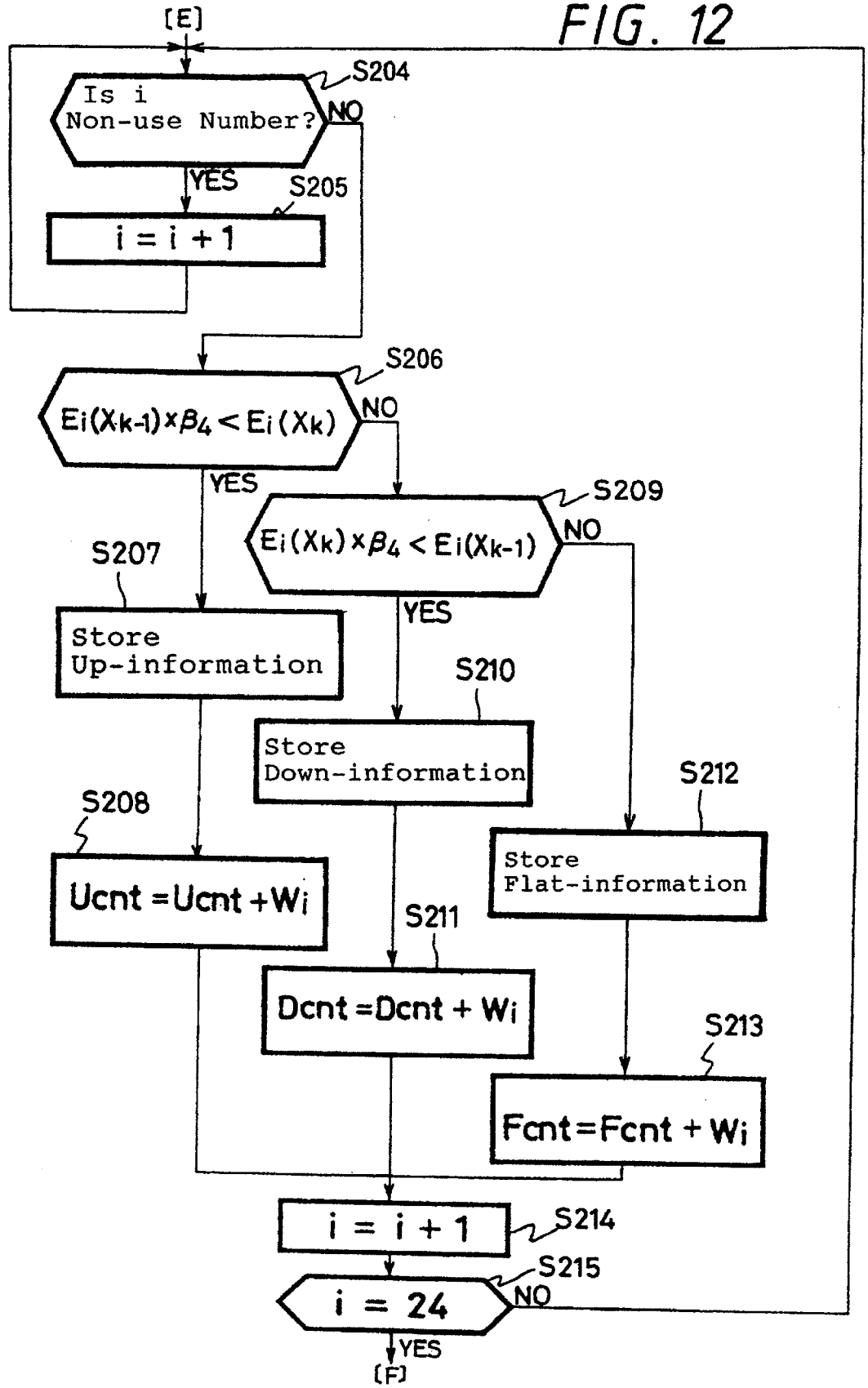
Figure 13:
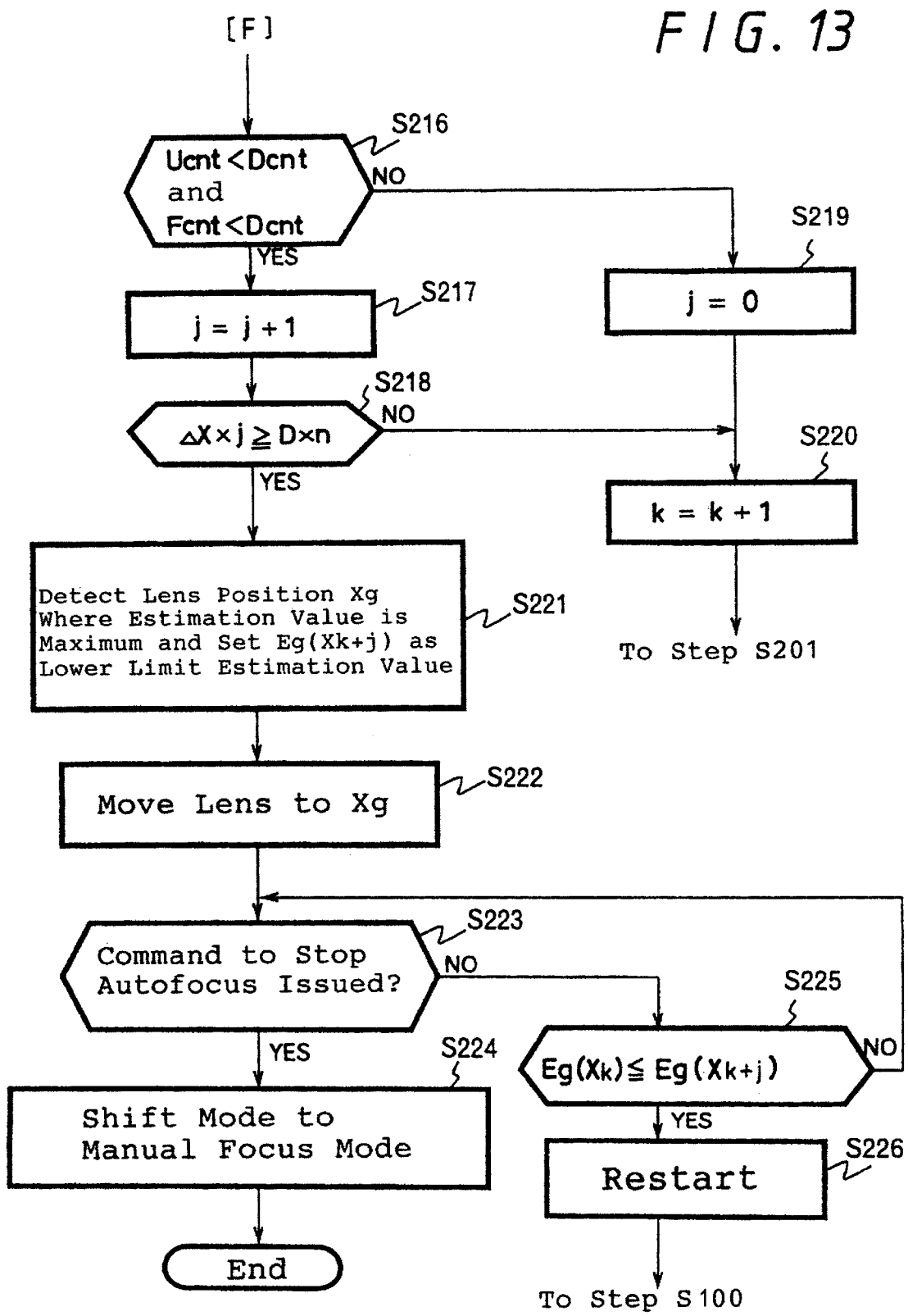

As shown in FIGS. 10 and 11, processings in step S117 to S131 are those in flowcharts for a specific operation for determining the lens movement direction.

In step S117, the number is set to i=1 and a count-up value $U_{cnt}$, a count-down value $D_{cnt}$ and a flat count value $F_{cnt}$ are reset.

In step S118, it is determined whether or not the number i is a number defined as a non-use number. If it is determined that the number i is not defined as the non-use number, then the processing proceeds to step S120. If it is determined that the number i is defined as the non-use number, then in step S119 the number i is incremented and then the next number of i is determined.

A processing in step S120 is a processing carried out when the estimation value $E_i(X_a)$ has not a value substantially equal to $E_i(X_2)$ but a value larger than $E_i(X_2)$ to some degree and when the estimation value $E_i(X_1)$ has not a value substantially equal to $E_i(X_0)$ but a value larger than $E_i(X_0)$ to some degree. To facilitate this processing further, the processing is that of determining, if the focus lens is moved in the Far direction from the position $X_2$ through the position $X_0$ to the position $X_1$, whether or not the estimation values are increased in an order of the estimation values $E_i(X_2)$, $E_i(X_0)$, $E_i(X_1)$. Specifically, it is determined by calculating the following equations;

$$E_i(X_2) \times \beta_3 < E_i(X_0)$$

and $$E_i(X_0) \times \beta_3 < E_i(X_1) \qquad (120)$$

where $\beta_3$ is a coefficient experimentally obtained and set to $\beta_3=1.03$ in this embodiment. If the above estimation values satisfy the equation (120), it means that as the focus lens is moved from the position $X_2$ through the position $X_0$ to the position $X_1$, the estimation values are increased in an order of the estimation values corresponding thereto. Then, the processing proceeds to the next step S121. If the above estimation values do not satisfy the equation (120), then the processing proceeds to step S122.

In step S121, the count-up value $U_{cnt}$ is added with the weight data Wi, and then the processing proceeds to step S126.

A processing in step S122 is a processing carried out when the estimation value $E_i(X_0)$ has not a value substantially equal to $E_i(X_1)$ but a value larger than $E_i(X_1)$ to some degree and when the estimation value $E_i(X_2)$ has not a value substantially equal to $E_i(X_0)$ but a value larger than $E_i(X_0)$ to some degree. To facilitate this processing further, the processing is that of determining, if the focus lens is moved in the Far direction from the position $X_2$ through the position $X_0$ to the position $X_1$, whether or not the estimation values are decreased in an order of the estimation values $E_i(X_2)$, $E_i(X_0)$, $E_i(X_1)$. Specifically, it is determined by calculating the following equations;

$$E_i(X_1) \times \beta_3 < E_i(X_0)$$

and $$E_i(X_0) \times \beta_3 < E_i(X_2) \qquad (122).$$

If the above estimation values satisfy the equation (122), it means that as the focus lens is moved from the position $X_2$ through the position $X_0$ to the position $X_1$, the estimation values are decreased in an order of the estimation values corresponding thereto. Then, the processing proceeds to the next step S123. If the above estimation values do not satisfy the equation (122), then the processing proceeds to step S124.

In step S123, the count-down value $D_{cnt}$ is added with the weight data Wi, and then the processing proceeds to step S126.

A processing in step S124 is a processing carried out when the estimation value $E_i(X_0)$ has not a value substantially equal to $E_i(X_1)$ but a value larger than $E_i(X_1)$ to some degree and when the estimation value $E_i(X_0)$ has not a value substantially equal to $E_i(X_2)$ but a value larger than $E_i(X_2)$ to some degree. To facilitate this processing further, the processing is that of determining, if the focus lens is moved in the Far direction from the position $X_2$ through the position $X_0$ to the position $X_1$, whether the peak of the estimation values lies in the estimation value $E_i(X_0)$. Specifically, it is determined by calculating the following equations;

$$E_i(X_1) \times \beta_3 < E_i(X_0)$$

and $$E_i(X_2) \times \beta_3 < E_i(X_0) \qquad (124).$$

If the above estimation values satisfy the equation (124), it means that when the focus lens is moved from the position $X_2$ through the position $X_0$ to the position $X_1$, the peak value of the estimation values is the estimation value $E_i(X_0)$. Then, the processing proceeds to the next step S125. If the above estimation values do not satisfy the equation (120), then the processing proceeds to step S126.

In step S125, the flat-count value $F_{cnt}$ is added with the weight data Wi, and then the processing proceeds to step S126.

In step S126, the number of i is incremented, and then the processing proceeds to step S127.

In step S127, it is determined whether or not the number of i is 24 because the horizontal-direction estimation value generating circuit 62 and the vertical-direction estimation value generating circuit 63 generate the twenty-four estimation values E. If the value of i is 24, then it is determined that calculations of all the estimation values are finished, and then the processing proceeds to step S128. If the value of i is not 24, then the processing loop formed of steps S118 to S127 is repeatedly carried out.

In step S128, it is determined by comparing the count-up value $U_{cnt}$, the count-down value $D_{cnt}$ and the flat-count value $F_{cnt}$, which is the largest value among the above count values. If it is determined that the count-up value $U_{cnt}$ is the largest, then the processing proceeds to step S129. If it is determined that the count-down value $D_{cnt}$ is the largest, then the processing proceeds to step S130. If it is determined that the flat-count value $F_{cnt}$ is the largest, then the processing proceeds to step S131.

In step S129, the microcomputer 64 determines that the direction toward the position $X_1$ is the hill-climbing direction of the estimation value, i.e., the direction in which the lens is to be in focus, and then supplies to the CPU 4 a signal designating the Far direction as the lens movement direction.

In step S130, the microcomputer 64 determines that the direction toward the position $X_2$ is the hill-climbing direction of the estimation value, i.e., the direction in which the lens is to be in focus, and then supplies to the CPU 4 a signal designating the Near direction as the lens movement direction.

In step S131, the microcomputer 64 determines that the position $X_o$ is the position at which the lens is in focus, and then the processing proceeds to step S218.

The operations in steps S118 to S131 will plainly be described with reference to the example shown in FIG. 15. FIG. 15 is a diagram showing transition of change of the estimation values $E_i(X_2)$, $E_i(X_0)$, $E_i(X_1)$ respectively obtained when the lens is located at the lens positions $X_2$, $X_0$, $X_1$, by way of example.

Initially, it is determined in step S118 whether or not the number of i is the non-use number. In this case, it is assumed that all the numbers of i are numbers of the estimation values which can be used.

In the first processing loop, the estimation values $E_1$ are estimated. Since $E_1(X_2) < E_1(X_0) < E_1(X_1)$ is established, then this relationship satisfies the condition in step S120 and hence the processing proceeds to step S121. Therefore, in step S121, the calculation of $U_{cnt} = 0 + W_1$ is carried out.

In the second processing loop, the estimation values $E_2$ are estimated. Since $E_2(X_2) < E_2(X_0) < E_2(X_1)$ is established, then this relationship satisfies the condition in step S120 and hence the processing proceeds to step S121. Therefore, in step S121, the calculation of $U_{cnt} = W_1 + W_2$ is carried out.

In the third, fourth and fifth processing loops, the calculations similar to those carried out in the first and second processing loops are carried out. In step S121 of the fifth processing loop, the calculation of $U_{cnt} = W_1 + W_2 + W_3 + W_4 + W_5$ is carried out.

In the sixth processing loop, the estimation values $E_6$ are estimated. Since $E_2(X_2) < E_2(X_0) > E_2(X_1)$ is established, then this relationship satisfies the condition in step S124 and hence the processing proceeds to step S125. Therefore, in step S125, the calculation of $F_{cnt} = 0 + W_6$ is carried out.

After the processing loops are repeatedly carried out twenty-four times as described above, finally the calculation of $$U_{cnt} = W_1 + W_2 + W_3 + W_4 + W_5 + W_7 + W_8 + W_9 + W_{11} + W_{13} + W_{14} + W_{15} + W_{17} + W_{18} + W_{21} + W_{24}$$

$$D_{cnt} = W_{10} + W_{16} + W_{22}$$

$$F_{cnt} = W_6 + W_{12} + W_{19}$$

has been carried out. If the values of the weight data $W_i$ shown in FIG. 7 by way of example are substituted for the above count-up value $U_{cnt}$, the above count-down value $D_{cnt}$ and the above flat count value $F_{cnt}$, then the following results are obtained.

$U_{cnt} = 124$ $D_{cnt} = 13$ $F_{cnt} = 18$

Therefore, since the count-up value $U_{cnt}$ has the largest value among them at the time of determination in step S128, the processing proceeds to step S129 in the example shown in FIG. 15. As a result, the direction toward $X_1$ is determined as the focus direction.

Processings in steps S200 to S221 are those for determining the lens position at which the estimation value becomes maximum. The processings will be described with reference to FIGS. 11, 12, 13 and 14.

For clear explanation of the processings in step S200 and the succeeding steps, the following equations are defined.

$$X_1 = X_0 + \Delta X$$
$$X_2 = X_0 + 2 \times \Delta X$$
$$X_3 = X_0 + 3 \times \Delta X$$
$$\vdots$$
$$X_k = X_0 + k \times \Delta X \quad (200)$$
$$X_{k+1} = X_0 + (k+1) \times \Delta X$$
$$\vdots$$
$$X_{k+j} = X_0 + (k+j) \times \Delta X$$

Since the estimation value is sampled in every field in this embodiment, a distance depicted by $\Delta X$ is defined as a distance by which the focus lens is moved in one field. Therefore, the distance $\Delta X$ depicts the distance by which the lens is moved in one field period. This distance $\Delta X$ not only depicts the distance by which the lens is moved in one field period but also has a polarity of $\Delta X$ determined based on the lens movement direction obtained in the processing in steps S100 to S130. For example, if the lens movement direction is the Far direction, the value of the distance $\Delta X$ is set so as to have a positive polarity. If the lens movement direction is the Near direction, the value of the distance $\Delta X$ is set so as to have a negative polarity.

In step S200, K=1 is set.

In step S201, the microcomputer 64 issues to the CPU 4 a command to move the lens to a position $X_k$. The lens position $X_k$ is defined based on equation (200) as $$X_k = X_0 + k \times \Delta X$$

In step S202, the microcomputer 64 stores in the RAM 66 the estimation values $E_1(X_k)$ to the estimation values $E_{24}(X_k)$ newly generated by the horizontal-direction estimation value generating circuit 62 and the vertical-direction estimation value generating circuit 63. The twenty-four estimation values $E_i$ are stored as a table shown in FIG. 16.

In step S203, i=1 and j=1 are set, and the count-up value $U_{cnt}$, the count-down value $D_{cnt}$ and the flat count value $F_{cnt}$ are reset.

In step S204, it is determined whether or not the number of i is defined as the non-use number. If the number of i is not defined as the non-use number, then the processing proceeds to step S206. If the number of i is defined as the non-use number, then in step S205 the value of i is incremented and the processing returns to step S204 again.

In step S206, it is determined whether or not the estimation values $E_i(X_k)$ obtained when the focus lens is moved from a position $X_{k-1}$ to a position $X_k$ are increased to a certain degree or more as compared with the estimation values $E_i(X_{k-1})$. Specifically, it is determined based on a calculation of $$E_i(X_{k-1}) \times \beta_4 < E_i(X_k) \quad (206)$$

where $\beta_4$ is a coefficient experimentally obtained and is set to $\beta_4 = 1.05$ in this embodiment. The satisfaction of the condition of the equation (206) leads to the fact that the estimation values $E_i(X_k)$ are increased to a certain degree or more as compared with the estimation values $E_i(X_{k-1})$. In this case, the processing proceeds to the next step S207. If the condition of the equation (206) is not satisfied, then the processing proceeds to step S209.

In step S207, since the estimation values $E_i(X_k)$ are increased to a certain degree or more as compared with the estimation values $E_i(X_{k-1})$, a 2-bit data "01" indicative of increase of the estimation value is stored in the RAM 66 as a U/D information (up/down information) in connection with the estimation value $E_i(X_k)$.

In step S208, similarly to step S121, the count-up value $U_{cnt}$ is added with the weight data $W_i$, and then the processing proceeds to step S214.

In step S209, it is determined whether or not the estimation values $E_i(X_k)$ obtained when the focus lens is moved from the position $X_{k-1}$ to the position $X_k$ are decreased to a certain degree or more as compared with the estimation values $E_i(X_{k-1})$. Specifically, it is determined based on a calculation of $$E_i(X_k) \times \beta_4 < E_i(X_{k-1}) \quad (209)$$

The satisfaction of the condition of the equation (209) leads to the fact that the estimation values $E_i(X_k)$ are decreased to a certain degree or more as compared with the estimation values $E_i(X_{k-1})$. In this case, the processing proceeds to the next step S210. If the condition of the equation (209) is not satisfied, then the processing proceeds to step S212.

In step S210, since the estimation values $E_i(X_k)$ are decreased to a certain degree or more as compared with the estimation values $E_i(X_{k-1})$, a 2-bit data "10" indicative of decrease of the estimation value is stored in the RAM 66 as the U/D information (up/down information) in connection with the estimation value $E_i(X_k)$.

In step S211, similarly to step S123, the count-down value $D_{cnt}$ is added with the weight data $W_i$, and then the processing proceeds to step S214.

In consideration of the conditions of the processings in step S206 and S209, the fact that the processing reaches step S212 means that the estimation values $E_i(X_k)$ obtained when the focus lens is moved from the position $X_{k-1}$ to the position $X_k$ are not changed to a certain degree or more relative to the estimation values $E_i(X_{k-1})$.

Therefore, in step S212, a 2-bit data "00" indicative of flatness of the estimation value is stored in the RAM 66 as the U/D information (up/down information) in connection with the estimation value $E_i(X_k)$.

In step S213, similarly to step S125, the flat-count value $F_{cnt}$ is added with the weight data $W_i$, and then the processing proceeds to step S214.

In step S214, the value of i is incremented, and then the processing proceeds to step S215.

In step S215, it is determined whether or not the value of i is 24. If it is determined that the value of i is 24, then it is determined that calculations of all the estimation values are finished, and then the processing proceeds to step S216. If it is determined the value of i is not 24, then the processing loop from step S204 to step S215 is repeatedly carried out until the value of i reaches 24.

Figure 17:
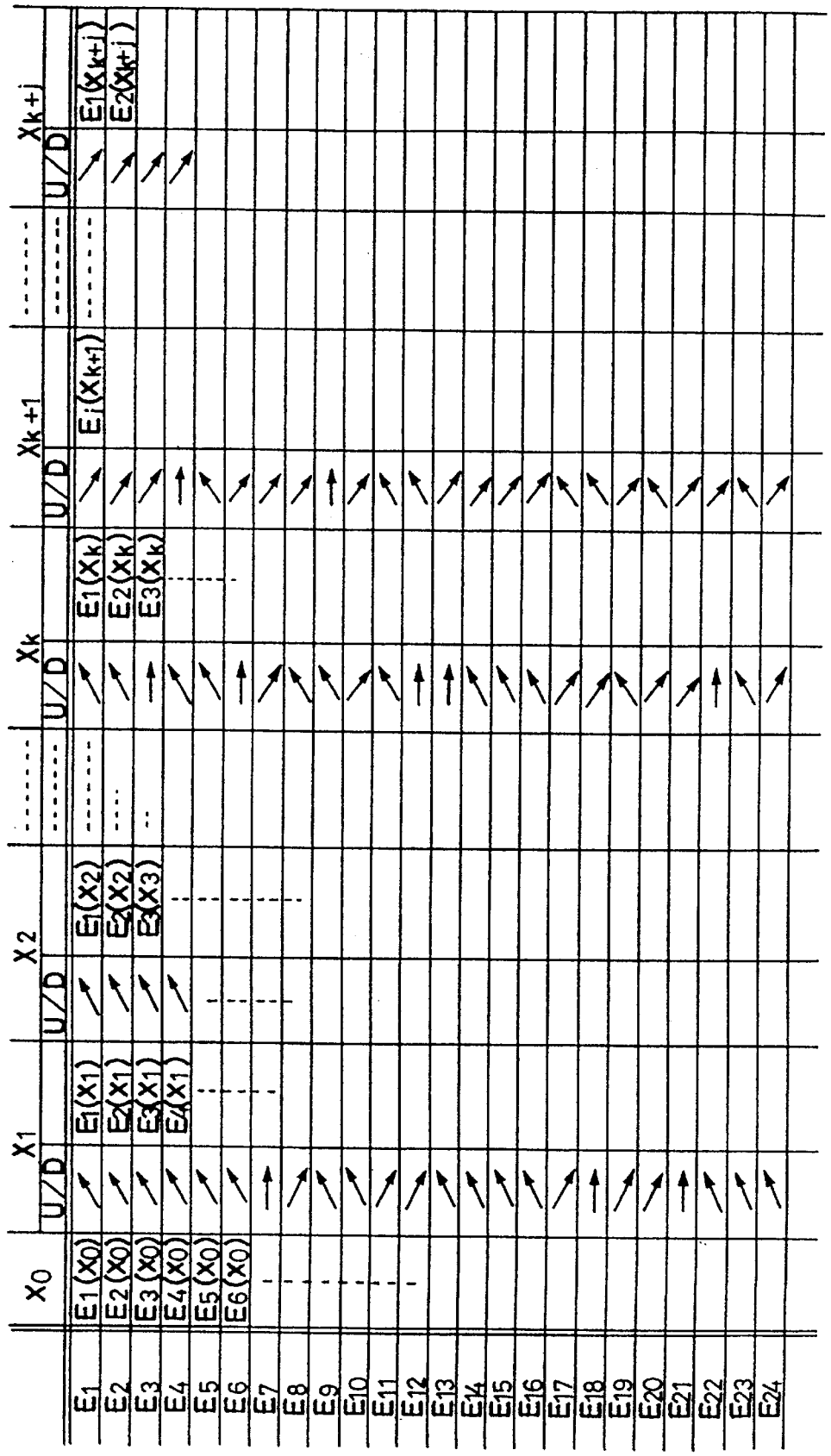
FIG. 17 is a table showing data stored in the RAM 66 during the autofocus operation.

A processing in step S216 is that for determining whether or not the count-down value $D_{cnt}$ is the largest among the count values. The processing in step S216 will be described by using an example shown in FIG. 17. FIG. 17 is a table showing a state of the respective estimation values and the respective up/down informations stored in the RAM 66. As shown in FIG. 17, the microcomputer 64 stores in the RAM 66 the respective estimation values and the respective up/down informations set in connection with the former so that these values and informations should correspond to the position $X_k$ to which the lens is moved.

When the lens is located at the position $X_k$, if the processing loop from step S204 to step S215 is repeatedly carried out, then the count-up value $U_{cnt}$, the count-down value $D_{cnt}$ and the flat-count value $F_{cnt}$ are as follows.

$U_{cnt} = W_1 + W_2 + W_4 + W_5 + W_8 + W_9 + W_{11} + W_{14} + W_{15} + W_{16} + W_{19} + W_{23}$ $D_{cnt} = W_7 + W_{10} + W_{17} + W_{18} + W_{20} + W_{21} + W_{24}$ $F_{cnt} = W_3 + W_6 + W_{12} + W_{13} + W_{22}$ If the values of the weight data $W_i$ show n in FIG. 7 by way of example are substituted for the above count-up value $U_{cnt}$, the above count-down value $D_{cnt}$ and the above flat count value $F_{cnt}$, then the following results are obtained.

$U_{cnt} = 95$ $D_{cnt} = 34$ $F_{cnt} = 31$

Specifically, although a value is increased, decreased or not changed depending upon each of the values, it is possible to judge in consideration of all the estimation values that the estimation value is increased.

An estimation value obtained by a synthetic judgement thus made in step S216 will hereinafter be referred to as "a total estimation value". Therefore, in other words, the processing in step S216 can be expressed as that for determining whether or not the total estimation value is decreased.

It will be described how to judge estimation values generated when the lens is located at the position $X_{k+1}$ as shown in FIG. 17 by way of example. When the lens is located at the position $X_{k+1}$, if the processing loop from step S204 to step S215 is repeatedly carried out, then the count-up value $U_{cnt}$, the count-down value $D_{cnt}$ and the flat-count value $F_{cnt}$ are as follows.

$U_{cnt} = W5 + W_{11} + W_{12} + W_{17} + W_{18} + W_{20} + W_{23}$ $D_{cnt} = W1 + W_2 + W_3 + W_6 + W_7 + W_8 + W_{10} + W_{13} + W_{14} + W_{15} + W_{16} + W_{19} + W_{21} + W_{22} + W_{24}$ $F_{cnt} = W4 + W_9$ If the values of the weight data $W_i$ shown in FIG. 7 by way of example are substituted for the above count-up value $U_{cnt}$, the above count-down value $D_{cnt}$ and the above flat count value $F_{cnt}$, then the following results are obtained.

$U_{cnt} = 29$ $D_{cnt} = 113$ $F_{cnt} = 18$

Specifically, study of the above results can lead to determination that the total estimation value is decreased. If it is determined in step S216 that the total estimation value is decreased, then the processing proceeds to step S217.

In step S217, the value of j is incremented, and then the processing proceeds to step S218. This value of j is a value indicative of how many times the determination result in step S216 is continuously YES, i.e., how many times the total estimation value is continuously decreased.

Assuming that the first lens position where the total estimation value starts continuously decreasing is the position $X_{k+1}$, it is determined in step S218 whether or not the lens movement distance (the distance between $X_k$ and $X_{k+j}$) is larger than D×n. An equation actually used for the determination is expressed by $$\Delta X \times j \geq D \times n \quad (218)$$

where D depicts a focal depth of the focus lens and n depicts a previously set coefficient. Study of experimental results reveals that when the value of n is set within the range of $1 \leq n \leq 10$, the autofocus operation at an optimum speed can be realized.

Figure 18:
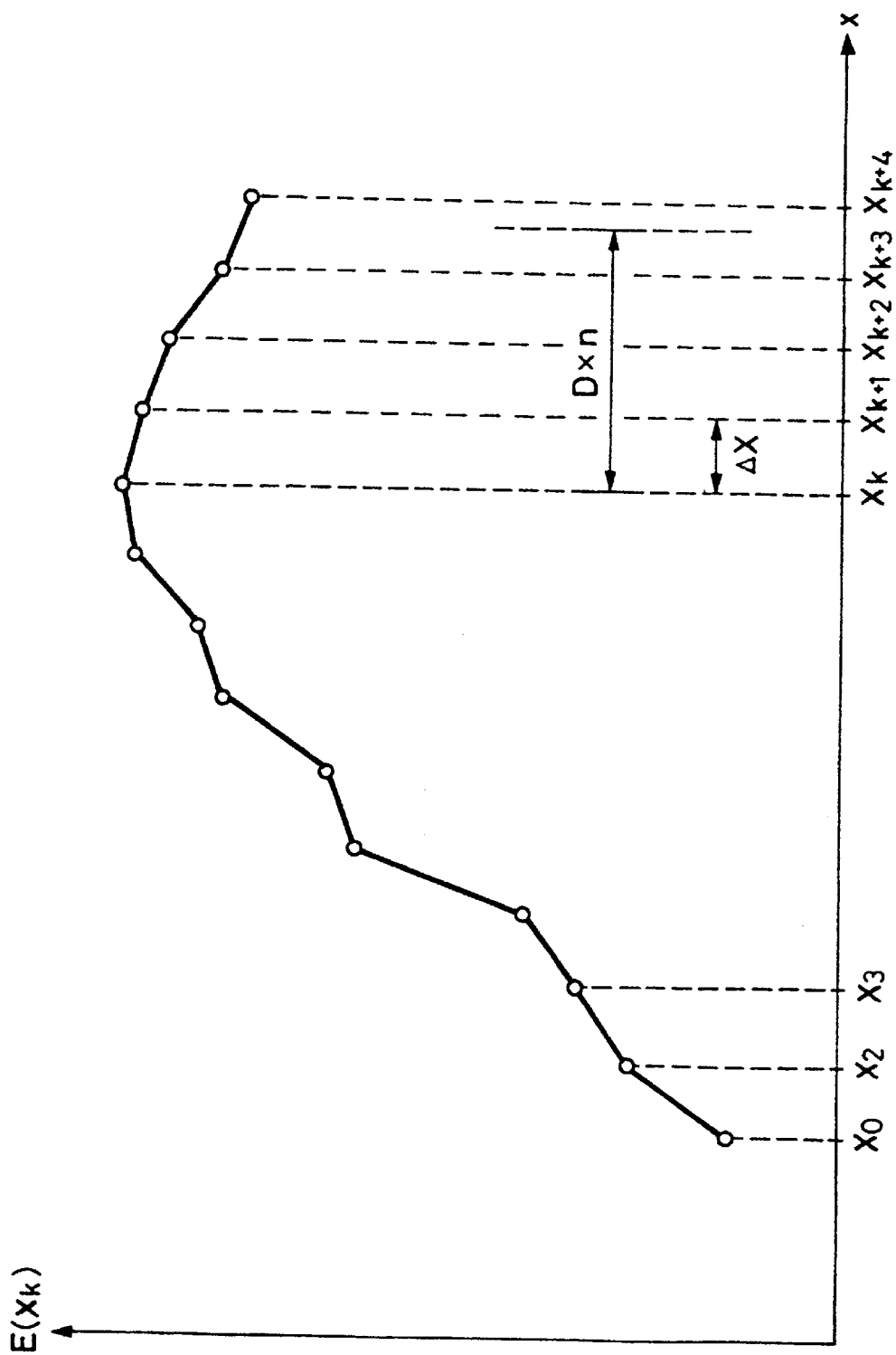
FIG. 18 is a graph showing change of the estimation values obtained upon the autofocus operation.

A determination carried out in step S218 will be described with reference to FIG. 18. An abscissa of a graph shown in FIG. 18 represents a lens position X, and an ordinate thereof represents an estimation value E(X) corresponding to the lens position.

When j=1 is established, the total estimation value is that obtained at the lens position where the total estimation value is decreased first time, and hence the lens position corresponding to j=1 is the lens position $X_{k+1}$. Therefore, a right side ($\Delta X \times j$) of the equation (218) represents the distance between the lens position $X_k$ located immediately before the total estimation value has been decreased and the first lens position $X_{k+1}$ where the total estimation value starts decreasing first. However, study of FIG. 18 reveals that the result of determination in step S218 is NO.

When j=2 is established, the total estimation value is that obtained at the lens position where the total estimation value has been decreased continuously twice, and hence the lens position corresponding to j=2 is the lens position $X_{k+2}$. Therefore, as shown in FIG. 18, a right side ($\Delta X \times j$) of the equation (218) represents the distance between the lens position $X_k$ located immediately before the total estimation value has been decreased and the lens position $X_{k+2}$ where the total estimation value has been decreased continuously twice. However, study of FIG. 18 reveals that the result of determination in step S218 is NO.

When j=3 is established, the result of determination in step S218 is NO similarly to that determined when j=2.

When j=4 is established, the total estimation value is that obtained at the lens position where the total estimation value has been decreased continuously four times, and hence the lens position corresponding to j=4 is the lens position $X_{k+4}$. Therefore, as shown in FIG. 18, a right side ($\Delta X \times j$) of the equation (218) represents the distance between the lens position $X_k$ located immediately before the total estimation value has been decreased and the lens position $X_{k+4}$ where the total estimation value has been decreased continuously twice. Accordingly, study of FIG. 18 reveals that ($\Delta X \times j$) $\geq$ D×n is established and hence the result of determination in step S218 is YES.

If on the other hand it is determined in step S216 that the count-down value $D_{cnt}$ does not have the largest value, then it is determined that the total estimation value is not decreased, and then the processing proceeds to step S219.

In step S219, the value of i is set to j=0. This processing is that for resetting the value of j. The reason for resetting the value of j is that j is the value indicative of how many times the total estimation value has been decreased continuously. Moreover, since the fact that the processing reaches step S219 means that it is determined in step S216 that the total estimation value is not decreased, the continuous decrease of the total estimation value is stopped at the time of determination in step S216. Accordingly, in step S219, the value of j is reset.

Since the value of j is reset when the continuous decrease of the total estimation value is stopped, even if a certain estimation value $E(X_k)$ has a maximum value produced simply by a noise in the example shown in FIG. 18, then the value of j is reset in the processing loop for the estimation values $E(X_{k+1})$ or $E(X_{k+2})$ or $E(X_{k+3})$ and hence the estimation value $E(X_k)$ is prevented from being estimated as the largest value.

In step S220, the value of k is incremented in order to further move the focus lens. Then, the processing returns to step S201.

If the result of the determination in step S218 is YES, then the processing proceeds to step S221. In step S221, since the total estimation value obtained when the lens is located at the lens position $X_k$ has been decreased continuously predetermined times (j times), the microcomputer 64 determines the lens position $X_k$ as a lens position $X_g$ where the estimation value becomes maximum.

Based on the up/down information stored in the RAM 66, the numbers of i satisfying that an up/down state of the estimation value and an up/down state of the estimation values Ei stored in the RAM 66 are agreed with each other are selected from the estimation values $E_i(X_k)$ obtained when the lens is located at the lens position $X_k$. If a weight data $W_g$ is the largest among the weight data $W_i$ whose numbers are selected numbers of i, then an estimation value $E_g(X_k)$ is defined as the maximum estimation value. When the maximum estimation value $E_g(X_k)$ is defined, an estimation value $E_g(X_{k+1})$ is defined as a lower limit estimation value corresponding to the maximum estimation value. While the maximum estimation value $E_g(X_k)$ is updated in every field even after the lens is fixed at the lens position $X_k$ and becomes in focus, the lower limit estimation value $E_g(X_{k+1})$ is fixed.

The above processing will be described by using the example shown in FIG. 17. When the lens is located at the lens position $X_k$, the total estimation value is increased based on the determination in step S216. When the lens is located at the lens position $X_{k+1}$, the total estimation value is decreased based on the determination in step S216. Therefore, the number i of the estimation value whose up/down information is increased when the lens is located at the lens position $X_k$ and decreased when the lens is located at the lens position $X_{k+1}$ is i=1, 2, 5, 8, 14, 15, 19 in the example shown in FIG. 17. Since the number, among the above numbers, corresponding to the largest weight data is iabt according to the data shown in FIG. 7, the estimation value $E_1(X_k)$ is employed as the maximum estimation value.

In step S222, the microcomputer 64 supplies the control signal to the CPU 4 so that the focus lens should be moved to the lens position $X_g$ where the estimation value is maximum.

In step S223, it is determined whether or not a command to stop the autofocus mode is issued. If the camera man operates a butt on to cancel the autofocus mode, then the processing proceeds to step S224, wherein the mode is shifted to the manual focus mode.

If it is determined in step S223 that the command to stop the autofocus mode is not issued, then the processing proceeds to step 1225, wherein the maximum estimation value $E_g(X_k)$ and the lower limit estimation value $E_g(X_{k+1})$ are compared. If the value of the maximum estimation value $E_g(X_k)$ becomes smaller than the lower limit estimation value $E_g(X_{k+1})$ due to change of an object or the like, then the processing proceeds to step S226, wherein the autofocus mode is restarted.

The operation of the autofocus mode has been described completely.

The present invention achieves the following effects.

Initially, since a plurality of estimation values can be obtained by combination of a plurality of filter coefficients and a plurality of window sizes, it is possible to handle various objects.

Since the weight data are allocated to the estimation value generating circuits and hence the total estimation value can be obtained based on the plurality of estimation values and the weight data respectively corresponding to the estimation values, the accuracy of the estimation value finally obtained is improved. As the accuracy of the estimation value is improved, the estimation-value curve describes a smooth parabola around the focus point, which allows high speed determination of the maximum estimation value. Therefore, the autofocus operation itself can be carried out at high speed.

Since the estimation values determined as the improper estimation values when the total estimation value is calculated are selected from the plurality of estimation values and the selected estimation values are not used for the determination of the total estimation value, the accuracy of the estimation values is further improved. For example, if the proper estimation value cannot be obtained with a small window, then the lens is focused on an object by using the estimation value corresponding to a window larger than the above small window. Therefore, it is possible to focus the lens on some object, which prevents the autofocus operation from being continued for a long period of time.

Moreover, when the lens movement direction is determined in order to focus the lens on an object, a plurality of changed estimation values are estimated by employing decision by majority thereof and the weight data. Therefore, it is possible to precisely determine the focus direction by employing the sampling points of small number and a fine movement in the focal depth of the lens.

When it is determined whether or not the maximum point of the estimation value represents the maximum estimation value, the lens is moved from the maximum point by a distance which is predetermined times as long as the focal depth. As a result, even if the hill of the estimation values is flat, it is possible to determine whether or not the maximum point represents the maximum estimation value when the lens is moved by a predetermined distance. Therefore, there can be obtained the effect in which the focus point can be determined at high speed. For example, it is possible to avoid output of an image which becomes considerably blurred and strange because the lens becomes considerably out of focus when it is determined whether or not the maximum point represents the maximum estimation value.

When the maximum estimation value obtained when the lens is located at the focus point is calculated, the estimation value satisfying that the up/down state of the total estimation value and the up/down information stored in the RAM 66 are agreed with each other and having the largest weight data is selected as the maximum estimation value. Therefore, it is possible to achieve the effect in which the precise value of the maximum estimation value can be obtained.

EXPLANATION OF REFERENCE NUMBERS 1 the lens unit
2 the imaging unit
3 the signal processing unit
4 the CPU
11 the zooming lens
12 the focus lens
13 the iris
34 the autofocus control circuit
62 the horizontal-direction estimation value generating circuit
63 the vertical-direction estimation value generating circuit
64 the microcomputer
66 the RAM
621 the high-pass filter
625 the window pulse generating circuit

What is claimed is:

1. A focus control apparatus comprising:
an estimation-value generating means for generating from a high-frequency component of a video signal output from an imagine means a plurality of estimation values corresponding to respective combinations of filter means and detection windows;
an estimation value determining means for determining for each estimation value of said estimation values whether or not said estimation value is a proper estimation value indicative of a focus degree with respect to a target object, thereby generating a plurality of proper estimation values, said determining means being operative to make such determination for two of said estimation values at a time by calculation the absolute value of the difference between said two estimation values to generate a difference measure, multiplying one of said two estimation values by a predetermined multiplier to generate a product, and comparing said difference measure to said product;

an arithmetic means for calculating weight data corresponding to said proper estimation values; and a control means for determining a focus direction based on said weight data calculated by said arithmetic means.

2. A video camera apparatus comprising:

an estimation-value generating means for generating from a high-frequency component of a video signal output from an imagine means a plurality of estimation values corresponding to respective combinations of filter means and detection windows;

an estimation value determining means for determining for each estimation value of said estimation values whether or not said estimation value is a proper estimation value indicative of a focus degree with respect to a target object, thereby generating a plurality of proper estimation values, said determining means being operative to make such determination for two of said estimation values at a time by calculating the absolute value of the difference between said two estimation values to generate a difference measure, multiplying one of said two estimation values by a predetermined multiplier to generate a product, and comparing said difference measure to said product;

an arithmetic means for calculating weight data corresponding to said proper estimation values; and a control means for determining a focus direction based on said weight data calculated by said arithmetic means.

3. A focus control apparatus for controlling a focus of a video camera, comprising:

an estimation-value generating means having a plurality of estimation value generating circuits for generating a plurality of estimation values by extracting a high-frequency component of a video signal output from an imaging means under respectively different conditions;

an estimation value determining means for determining for each estimation value of said estimation values whether or not said estimation value is a proper estimation value indicative of a focus degree with respect to a target object, thereby generating a plurality of proper estimation values, said determining means being operative to make such determination for two of said estimation values at a time by calculating the absolute value of the difference between said two estimation values to generate a difference measure, multiplying one of said two estimation values by a predetermined multiplier to generate a product, and comparing said difference measure to said product; and a control means for determining a focus lens movement direction for which said plurality of proper estimation values are increased while said focus lens is being moved, by utilizing weight data associated with said plurality of proper estimation values.

4. A focus control apparatus according to claim 3, wherein said control means comprises storage means for storing said plurality of proper estimation values respectively generated in connection with a plurality of positions of said focus lens.

5. A focus control apparatus according to claim 4, wherein said control means detects changes of said plurality of proper estimation values corresponding to one of said positions of said focus lens, based on said plurality of estimation values previously sto red in said storage means.

6. A focus control apparatus according to claim 3, wherein in view of all changes of said plurality of proper estimation values, said control means detects a focus lens position where said estimation values become maximum while said focus lens is being moved in a direction in which said plurality of proper estimation values are increased, and, if any of said proper estimation values are continuously decreased while said focus lens is being further moved from said lens position, determines the lens position where said proper estimation values are maximum as ajust focus position.

7. A focus control apparatus according to claim 6, wherein said control means controls said estimation value generating means to generate said estimation values on a per field basis while said focus lens is moved at a speed at which it moves by a distance longer than said focal depth within one field.

8. A focus control apparatus according to claim 3, wherein said control means detects said just focus position by using said weight data respectively allocated to said plurality of proper estimation values.

9. A focus control apparatus according to claim 3, wherein said conditions respectively corresponding to said plurality of estimation values are determined according to a filter characteristic for extracting said high-frequency component of said video signal and a size of a detection window for said video signal.

10. A focus control apparatus according to claim 3, wherein said control means carries out a lens-movement-direction discriminating processing for determining said direction, wherein said plurality of proper estimation values is increased when said focus lens is moved in said direction a distance ranging within a focal depth of said focus lens, and then carries out ajust focus detecting processing for detecting said just focus position while said focus lens is being moved in said direction.

11. A focus control apparatus according to claim 10, wherein said lens-movement-direction discriminating processing is carried out by determining said focus lens movement direction based on said plurality of proper estimation values obtained when the focus lens is located at an initial lens position, said plurality of proper estimation values obtained when the focus lens is located at a first movement position situated away from said initial lens position by a predetermined distance and closer to said target object than said initial position, and said plurality of proper estimation values obtained when the focus lens is located at a second movement position situated away from said initial lens position by a predetermined distance and closer to said imaging means than said initial position.

12. A focus control apparatus according to claim 11, wherein said predetermined distance does not exceed said focal depth of said focus lens.

13. A focus control apparatus according to claim 10, wherein said control means controls said estimation value generating means to generate said estimation values on a per field basis while said focus lens is moved at a speed at which it moves by a distance longer than said focal depth within one field.

14. A focus camera apparatus having an autofocus function, comprising:

an estimation-value generating means having a plurality of estimation value generating circuits for generating a plurality of estimation values by extracting a high-frequency component of a video signal output from an imaging means under respectively different conditions;

an estimation value determining means for determining for each estimation value of said estimation values whether or not said estimation value is a proper estimation value indicative of a focus degree with respect to a target object thereby operating a plurality of proper estimation values, said determining means being operative to make such determination for two of said estimation values at a time by calculating the absolute value of the difference between said two estimation values to generate a difference measure, multiplying one of said two estimation values by a predetermined multiplier to generate a product, and comparing said difference measure to said product; and a control means for determining a focus lens movement direction for which said plurality of proper estimation values are increased while said focus lens is being moved, by utilizing weight data associated with said plurality of proper estimation values and for controlling movement of said focus lens based on said direction.

15. A method for controlling a focus of a video camera, comprising the steps of:

generating a plurality of estimation values by extracting a high-frequency component of a video signal output from an imaging means under respectively different conditions;

determining for each estimation value of said estimation values whether or not said estimation value is a proper estimation value indicative of a focus degree with respect to a target object, thereby generating a plurality of proper estimation values, wherein said step of determining involves making such determination for two of said estimation values at a time by calculating the absolute value of the difference between said two estimation values to generate a difference measure, multiplying one of said two estimation values by a predetermined multiplier to generate a product, and comparing said difference measure to said product;

ascertaining a focus lens movement direction for which said plurality of proper estimation values are increased while said focus lens is being moved, by utilizing weight data associated with said plurality of proper estimation values; and moving said focus lens in the lens movement direction.

* * * * *